US008028039B1

(12) United States Patent
Hawkins

(10) Patent No.: US 8,028,039 B1
(45) Date of Patent: Sep. 27, 2011

(54) SYSTEM AND METHOD FOR COMMUNICATING DATA BETWEEN WIRELESS MOBILE HAND-HELD COMPUTER AND A BACK-END COMPUTER SYSTEM

(75) Inventor: Stan Hawkins, Snellville, GA (US)

(73) Assignee: Reflexis Systems, Inc., Needham, MA (US)

( * ) Notice: Subject to any disclaimer, the term of this patent is extended or adjusted under 35 U.S.C. 154(b) by 777 days.

(21) Appl. No.: 11/317,646

(22) Filed: Dec. 23, 2005

(51) Int. Cl.
*G06F 15/16* (2006.01)
*G06F 15/173* (2006.01)
*G06F 9/00* (2006.01)
*G06F 9/24* (2006.01)
*G06F 15/177* (2006.01)
*G06F 7/04* (2006.01)
*G06F 17/30* (2006.01)

(52) U.S. Cl. ........ 709/219; 709/217; 709/222; 709/224; 709/225; 709/226; 713/1; 726/2

(58) Field of Classification Search .................... 709/217
See application file for complete search history.

(56) References Cited

U.S. PATENT DOCUMENTS

| | | | |
|---|---|---|---|
| 5,239,294 A * | 8/1993 | Flanders et al. ............. 340/5.74 |
| 5,644,723 A | 7/1997 | Deaton et al. | |
| 5,677,955 A | 10/1997 | Doggett et al. | |
| 5,737,701 A | 4/1998 | Rosenthal et al. | |
| 5,774,551 A | 6/1998 | Wu et al. | |
| 5,794,259 A | 8/1998 | Kikinis | |
| 5,815,665 A | 9/1998 | Teper et al. | |
| 5,855,007 A | 12/1998 | Jovicic et al. | |
| 5,872,850 A | 2/1999 | Klein et al. | |
| 5,911,141 A | 6/1999 | Kelley et al. | |
| 5,983,208 A | 11/1999 | Haller et al. | |
| 6,005,939 A | 12/1999 | Fortenberry et al. | |
| 6,052,710 A | 4/2000 | Saliba et al. | |
| 6,073,106 A | 6/2000 | Rozen et al. | |

(Continued)

FOREIGN PATENT DOCUMENTS

WO   WO 01/46783   6/2001

OTHER PUBLICATIONS

Microsoft.NET Passport Technical Overview, Sep. 2001, entire article.

(Continued)

*Primary Examiner* — Kevin Bates
*Assistant Examiner* — Tom Y Chang
(74) *Attorney, Agent, or Firm* — Smith Risley; Steven P. Wigmore

(57) ABSTRACT

An asynchronous, middleware system positioned between a larger computer system and a wireless mobile hand-held computer anticipates the needs of a wireless mobile hand-held computer that is served by the middleware system. The middleware system can anticipate and process needs for a mobile hand-held computer when the hand-held computer is not "synchronized" with a larger computer network. The middleware system can be designed to prepare information for downloading from a larger computer system to a wireless mobile hand-held computer well in advance of a communication link while the hand-held computer is not "synchronized" with the larger computer network. The middleware system can provide a network architecture that is very durable, scaleable, and flexible to serve hundreds and thousands of wireless mobile hand-held computers.

4 Claims, 9 Drawing Sheets

U.S. PATENT DOCUMENTS

| | | | |
|---|---|---|---|
| 6,125,352 A | 9/2000 | Franklin et al. | |
| 6,134,588 A * | 10/2000 | Guenthner et al. | 709/226 |
| 6,154,768 A | 11/2000 | Chen et al. | |
| 6,192,380 B1 | 2/2001 | Light et al. | |
| 6,199,079 B1 | 3/2001 | Gupta et al. | |
| 6,208,659 B1 | 3/2001 | Govindarajan et al. | |
| 6,233,608 B1 * | 5/2001 | Laursen et al. | 709/217 |
| 6,243,688 B1 | 6/2001 | Kalina | |
| 6,247,029 B1 | 6/2001 | Kelley et al. | |
| 6,253,203 B1 | 6/2001 | O'Flaherty et al. | |
| 6,298,347 B1 | 10/2001 | Wesley | |
| 6,321,339 B1 | 11/2001 | French et al. | |
| 6,356,905 B1 | 3/2002 | Gershman et al. | |
| 6,385,596 B1 | 5/2002 | Wiser et al. | |
| 6,401,085 B1 | 6/2002 | Gershman et al. | |
| 6,491,217 B2 | 12/2002 | Catan | |
| 6,571,279 B1 | 5/2003 | Herz et al. | |
| 6,571,285 B1 | 5/2003 | Groath et al. | |
| 6,584,448 B1 | 6/2003 | Laor | |
| 6,665,704 B1 | 12/2003 | Singh | |
| 6,725,050 B1 | 4/2004 | Cook | |
| 6,845,370 B2 | 1/2005 | Burkey et al. | |
| 6,961,589 B2 * | 11/2005 | Pautonnier | 455/561 |
| 7,062,556 B1 * | 6/2006 | Chen et al. | 709/226 |
| 7,340,395 B2 * | 3/2008 | Gurram et al. | 704/231 |
| 2001/0011250 A1 | 8/2001 | Paltenghe et al. | |
| 2002/0002684 A1 | 1/2002 | Fox et al. | |
| 2002/0004796 A1 * | 1/2002 | Vange et al. | 707/10 |
| 2002/0107972 A1 | 8/2002 | Keane | |
| 2002/0161908 A1 * | 10/2002 | Benitez et al. | 709/231 |
| 2003/0018764 A1 * | 1/2003 | Shell et al. | 709/223 |
| 2003/0220990 A1 * | 11/2003 | Narayanan et al. | 709/220 |
| 2004/0216098 A1 * | 10/2004 | Roe et al. | 717/161 |
| 2005/0027821 A1 * | 2/2005 | Alexander et al. | 709/218 |
| 2005/0267954 A1 * | 12/2005 | Lewis et al. | 709/221 |
| 2006/0006995 A1 * | 1/2006 | Tabankin et al. | 340/521 |
| 2006/0031525 A1 * | 2/2006 | Reeves et al. | 709/227 |
| 2006/0079230 A1 * | 4/2006 | Russell | 455/434 |
| 2006/0233155 A1 * | 10/2006 | Srivastava | 370/351 |
| 2006/0242318 A1 * | 10/2006 | Nettle et al. | 709/238 |
| 2007/0087682 A1 * | 4/2007 | DaCosta | 455/3.01 |

OTHER PUBLICATIONS

Microsoft.NET Passport, "What's New", Sep. 2001, entire article.
Webpage entitled: "Free Password Manager—Store passwords—Desktop or Online", available at www.passwordsafe.com, 1 page.
Secure Your Web Site With Passport, "Implement Passport", *Visual Studio Magazine*, pp. 1-3.
Jon Rauschenberger, Secure Your Web Site With Passport, "Simplify Your Web Site Visitors' Experience by Authenticating Them", *Visual Studio Magazine*, pp. 1-3.
Secure Your Web Site With Passport, "Sign In, Please", *Visual Studio Magazine*, pp. 1-3.
Secure Your Web Site With Passport, "Passport Key to HailStorm's Success", *Visual Studio Magazine*, pp. 1-2.
*Implementing Mobile Passport*, pp. 1-5.
Webpage entitled: "Zkey—Corporate", available at www.zkey.com, 1 page.
Alan Cohen and Walaika Haskins, "Grab-and-Go Web", *PC Magazine*, Oct. 19, 2000, pp. 1-3.
Webpage entitled: "LinkUall.com—Products—Calendars and Address books", available at www.linkuall.com, pp. 1-2.
Webpage entitled: "LinkUall.com—About Us—LinkUall Technology", available at www.linkuall.com, 1 page.
Microsoft PressPass, Microsoft.NET: "A Platform for the Next Generation Internet", Jun. 22, 2000, pp. 1-7.
Microsoft Press Release. "Microsoft Passport Offers Streamlined Purchasing Across Leading Web Sites", Oct. 11, 1999, pp. 1-4.
Graeme Bennett, PC Buyer's Guide.com, (updated Jun. 22, 2000), "NGWS—Microsoft's Dot Net Strategy", pp. 1-5.
Webpage entitled: "Microsoft's Passport: A single name, password and wallet for the web," available at www.passport.com, pp. 1-2.
Webpage entitled: "Microsoft's Passport *Member Services*, What is Passport", available at www.passport.com, pp. 1-12.
Webpage entitled: "Microsoft's Passport: Streamlining Commerce and Communication on the Web", available at www.passport.com, Oct. 11, 1999, pp. 1-3.
Webpage entitled: "Online Businesses Use Microsoft Passport Single Sign-In and Wallet Services to Provide Customers with Secure and Convenient Shopping", available at www.microsoft.com, May 17, 2000, pp. 1-2.
Garry Gunnerson, "EZ Login", *PC Magazine*, pp. 1-2, Mar. 14, 2000.
"Ezlogin.Com Introduces Liveclips, Enabling Net Users to Clip Content from Anywhere on the Web and Paste it on a Custom Page", Java Industry Connection, Mar. 8, 2000, pp. 1-2.
Webpage entitled: "724 Solutions—Products—Wireless Internet Platform", available at www.724.com, pp. 1-3.
Webpage entitled: "724 Solutions—Products—m-Commerce", available at www.724.com, pp. 1-4.
Webpage entitled: "724 Solutions—Products—Financial Services", available at www.724.com, 1 page.
Gator Press Release. "Gator.Com Delivers on the Promise of the Electronic Commerce Modeling Language (ECML) Standard Today: Gator offers one-click shopping at over 5,000 e-commerce sites today", Jun. 14, 1999, pp. 1-2.
Gator Press Release. "Internet Start-up Gator.com Introduces Gator, the Web's First Smart Online Companion: New Internet product offers one-click login and express registration and checkout across the web", Jun. 14, 1999, pp. 1-3.
Gator Press Release. "Gator Helps Consumers at More than 25,000 E-Commerce and Registration Sites in First Month of Usage: Software an invaluable companion for more than 80,000 online consumers", Aug. 3, 1999, pp. 1-2.
Webpage entitled: "Affiliate Application" *How do Gator, Price Helper, and OfferCompanion Work?*, available at www.gator.com, 1 page.
Webpage entitled: "Yodlee: e-Personalization Solutions", available at www.yodlee.com, pp. 1-2.
Webpage entitled: "Yodlee: e-Personalization Platform", available at www.yodlee.com, 1 page.
Webpage entitled: "Yodlee: e-Personalization Applications", available at www.yodlee.com, 1 page.
Webpage entitled: "Yodlee for Web: One-Click Access to All Personal Accounts", available at www.yodlee.com, 1 page.
Webpage entitled: "Yodlee for Mobile: Simplify Your Life on the Road with Yodlee2Go", available at www.yodlee.com, 1 page.
Webpage entitled: "Yodlee2Go: Palm OS Wireless", available at www.yodlee.com, 1 page.
Webpage entitled: "Yodlee2Go: Web-enabled Phones", available at www.yodlee.com, 1 page.
Webpage entitled: "Security Overview", available at www.yodlee.com, pp. 1-2.
Webpage entitled: "Co-Brand Partner Opportunities", available at www.yodlee.com, pp. 1-2.
Webpage entitled: "Content Partner Opportunities", available at www.yodlee.com, 1 page.
Webpage entitled: "Sweet Enonymity", available at www.enonymous.com, pp. 1-2.
Webpage entitled: "Vision for an Enonymous Infomediary", available at www.enonymous.com, pp. 1-3.
Webpage entitled: "Learn More", available at www.digitalme.com, pp. 1-2.
Webpage entitled: "Take Control", available at www.ditigalme.com, pp. 1-2.
Webpage entitled: "Make it Convenient", available at www.digitalme.com, pp. 1-3.
Webpage entitled: "Create Relationships", available at www.digitalme.com, pp. 1-2.
Webpage entitled: "FAQ", available at www.digitalme.com, pp. 1-2.
Webpage entitled: "Digitalme™ Fact Sheet (www.digitalme.com)", available at www.digitalme.com, pp. 1-3.
"Choicepoint Unveils New Web-based Pre-employment Screening Service", BusinessWire p. 1287, May 17, 1999.

* cited by examiner

SYSTEM AND METHOD FOR COMMUNICATING DATA BETWEEN WIRELESS MOBILE HAND-HELD COMPUTER AND A BACK-END COMPUTER SYSTEM

RELATED PATENT APPLICATIONS

This application is related to co-pending U.S. patent application Ser. No. 10/421,639, entitled "Systems and Methods for Providing Field Force Automation in Big Box Retail Environments," filed on Apr. 22, 2003. The complete disclosure of the above-identified related application is hereby fully incorporated herein by reference.

TECHNICAL FIELD

The invention relates to middleware that provides connectivity between wireless mobile hand-held computers and back-end computer systems. More particularly, the invention relates to a system and method for establishing communications over a computer network between multiple wireless mobile hand-held computers and one or more back-end computer systems.

BACKGROUND OF THE INVENTION

In the past, mobile hand-held computers typically had very low memory resources and a short battery life. These restrictions caused mobile hand-held computers to be very one dimensional meaning that they could only run or execute single function computer applications. For example, many mobile hand-held computers could only run a small suite of specific applications such as wireless e-mail and electronic calendars.

But advances have been made in the art so that mobile hand-held computers are now more robust. For example, many mobile hand-held computers are capable of running or executing multiple computer software applications that can be found on most non-mobile, fixed desk-top computer systems. For example, many mobile hand-held computers can run complex graphical user interfaces and computer operating systems such as Microsoft Windows® and Linux.

While significant advances have been made in mobile hand-held computers, the technology that allows these mobile hand-held computers to wirelessly connect or "couple" to larger computer networks such as wide area networks (WANs), local area networks (LANs), and the Internet has not progressed at the same rate. Wireless technology that allows mobile hand-held computers to connect to larger computer networks is critical for the mobile hand-held computers because of the need for the exchange of data between a mobile hand-held computer and a larger computer network.

Data usually must be exchanged between a mobile hand-held computer and a larger computer network because of the context or application of the mobile hand-held computer environment. For example, a corporate entity may have hundreds of employees who do not work in a typical "office setting" and who use mobile hand-held computers on a daily basis to generate revenue for the corporate entity. One such environment includes a sales business in which sales employees are constantly away from their home "office setting" because they are meeting potential customers at respective customers' places of business.

Another environment that requires a mobile hand-held computer to exchange information with a larger computer network includes the construction business. The construction business usually includes employees who are working at a new site in which conventional wired connections with a larger computer network are usually unavailable or are inconvenient (or both). In such an environment, only a wireless link between an employee's mobile hand-held computer and the larger corporate computer network is practical.

In all of the mobile computing environments described above, the data exchange between the mobile hand-held computer and the larger computer network can benefit both the employee with the mobile hand-held computer and the company who manages the large computer network. The employee can benefit from the data exchange by receiving the most current information regarding tasks or work that have been assigned to the employee. The employee can have access to more information than can be stored on his mobile hand-held computer by being able to connect to the larger computer network that has significantly more data records because of the size of its memory relative to the mobile hand-held computer.

Similarly, the larger computer network can benefit from the data exchange by receiving the most current information that is collected by the employee with his mobile hand-held computer. The larger computer network allows a company to track the progress made by its employees in field who are outside of the conventional "office setting." In this way, the larger computer network allows a company to view the larger picture by accessing all of the data collected by its employees in the mobile environment.

The data exchanged between the larger computer network and the mobile hand-held computer can be any type of binary content. Such binary content can include, but is not limited to, photographs, signatures, voice, text files, word processing files, spreadsheet files, programs for the mobile hand-held computer, and other like binary content.

To exchange data between the mobile hand-held computer and a larger computer network over a wireless link, conventional technology often requires a rather complex conversation between the mobile hand-held computer and the larger computer network. For example, many conventional wireless solutions treat mobile hand-held computer should like an Internet browser that is trying to access an Internet web service which can be managed by the larger computer network. Such an Internet-like browser model requires a significant number of complex messages to be exchanged between the mobile hand-held computer and the larger computer network.

While some mobile hand-held computers and larger computer systems could be designed to support the Internet model, the design would likely only function if the wireless link was perfect. In other words, many conventional wireless solutions for the mobile hand-held computer environment assume that the wireless link can always be established when it is requested by either the mobile hand-held computer or the larger computer network. This is not the case because of the nature of wireless links. Typical wireless links include a radio frequency type in which the mobile hand-held computer communicates with the larger computer network using radio frequency electromagnetic waves. Other wireless links can include, but are not limited to, magnetic, optical, acoustic, and other similar wireless technologies.

Wireless links are usually never perfect and usually cannot be established when they are requested or desired. This means that a wireless link between a mobile hand-held computer and a larger computer network is usually short lived and may occur only intermittently. Many conventional wireless solutions for the mobile hand-held computer environment do not take this inconsistent and periodic nature of wireless links into account, and therefore, most conventional solutions fail to establish a meaningful data exchange between the mobile hand-held computer and the larger computer network. Many conventional wireless solutions consume too much time during a wireless communication link performing the same tasks that occur during a wired communication link.

Another problem with conventional wireless solutions for the mobile hand-held computer environment is directly related to the assumption that a wireless link will always be available and that it not be subject to disruptions. Specifically, the conventional solutions try to determine what is required of the mobile hand-held computer and the larger computer network while the wireless link exists. In other words, because conventional solutions assume that the wireless link will be perfect and available on demand, the solutions determine what is needed by the mobile hand-held computer while the hand-held computer is linked to the larger computer network.

Similarly, the conventional solutions also determine what is needed by the larger computer network from the mobile hand-held computer only during the existence of the wireless link. Such extended processing during the existence of the wireless link consumes valuable time without any meaningful data being exchanged between the mobile hand-held computer and the larger computer network.

One conventional mobile hand-held computer solution that can be used with wireless links at the time of this writing is Merger Replication. This technology is made and marketed by Microsoft®. This conventional solution encounters many of the problems discussed above. In addition to the problems discussed above, this solution also encounters problems when several hundred mobile hand-held computers are trying to establish a wireless link at the same time.

The processing load on the receiving systems with this conventional solution is usually very high when the receiving systems are servicing several hundred mobile hand-held computers. The size or volume of this load can causes this conventional solution to require a significant amount of maintenance to keep it running. For example, the databases and the logic that handles the communication between the mobile hand-held computer and the larger computer network are very tightly connected such that any change to one element in the middleware system directly affects another element in the middleware system. This wireless solution can be characterized as a very brittle environment that operates in real time or in a synchronous manner. Because of the tight relationships between the real-time or synchronous elements, the conventional solution can be very susceptible to failure in large mobile computing environments.

Conventional wireless solutions for the mobile computing environments typically break down when a threshold number of users are being serviced. It has been found that this threshold is usually about three-hunched (300) mobile hand-held computers. Any number above this threshold can cause the conventional systems to rapidly break down or simply fail. The conventional solutions are simply not scalable for servicing hundreds and thousands of wireless mobile hand-held computers.

Accordingly, there is a need in the mobile computing art that is scaleable and flexible so that hundreds or thousands or similar orders of magnitude of wireless mobile hand-held computers can be serviced by a single unified system. There is a further need in the art for a mobile computing solution that allows information to be exchanged efficiently over a wireless link between mobile hand-held computers and a larger computer system. There is a need in the art for a system that is designed to handle the inconsistent and periodic nature of wireless links with mobile hand-held computers.

SUMMARY OF THE INVENTION

The invention can be characterized as an asynchronous, middleware system positioned between a larger computer system and a wireless mobile hand-held computer that anticipates the needs of the wireless mobile hand-held computer that is served by the middleware system. The term, "asynchronous," is used to describe the middleware system because the middleware system can pre-process information that is destined for and received from a wireless mobile hand-held computer when the hand-held computer is not coupled, or off-line relative to the larger computer system.

In other words, the inventive middleware system can anticipate and process needs for a mobile hand-held computer when the hand-held computer is not "synchronized" with a larger computer network. The invention can be designed to prepare information for downloading from a larger computer system to a wireless mobile hand-held computer well in advance of a communication link while the hand-held computer is not "synchronized"—not coupled to the larger computer network. A communication link can comprise a wireless mobile hand-held computer that may be coupled to or on-line with or "synchronizing with" a larger computer system such that the larger computer system can send data to and receive data from the wireless mobile hand-held computer.

The middleware system can also simply receive information uploaded from the wireless mobile hand-held computer during a communication link without adding time to the communication link. The middleware system can reduce or eliminate extra communications that are associated with processing information when information is uploaded to the middleware system from the wireless hand-held computer. In other words, the middleware system can keep communications between the middleware system and a wireless mobile hand-held computer simple in order to promote efficient and rapid transfer of information between the middleware system and a wireless mobile hand-held computer during a communication link and in order to reduce the duration of a communication link.

As one example of the simple communications between the inventive system and a wireless mobile hand-held computer during a communication link, the middleware system does not typically perform any rigorous authentication of the wireless hand-held computer. Instead, the middleware system can usually authenticate a wireless hand-held computer by comparing a wireless hand-held computer identifier that is unique to the wireless hand-held computer and stored by the middleware system with the identifier that is transmitted by the wireless hand-held computer. If these two identifiers match, the wireless mobile hand-held computer can be authenticated by the middleware system.

According to a further exemplary aspect, the middleware system can be designed so that the wireless mobile hand-held computers are not always trying to establishing a communications link with the back-end computer system. It is recognized that only a small number of applications need a constant communication link with a larger computer network. Therefore, the inventive middleware system can be designed to take advantage of the fact that most applications do not need a constant or frequent communications link with the back-end computer system.

According to one exemplary aspect, the wireless mobile hand-held computer can be programmed to initiate a communication link at set times during a day or at predetermined intervals. The wireless mobile hand-held computer can also initiate a communication link if it determines that the back-end computer system needs access to any data that is stored on the wireless mobile hand-held computer. Similarly, a communication link can be initiated in response to the back-end computer system desiring to send the hand-held computer some data that it deems as essential or important for the hand-held computer to have.

To reduce the duration of an upload from a wireless mobile hand-held computer during a communication link, the middleware system can check a registry of files sent from the wireless hand-held computer against a registry of files maintained by the middleware system. The middleware system can request the wireless hand-held computer to upload only those files that the middleware system has not already received. Similarly, the middleware system can check the wireless hand-held computer registry for files that the hand-held computer has not received from the middleware system so that the middleware system only downloads files to the hand-held computer that have not been received by the hand-held computer. This can reduce the duration of a download from the middleware system to the wireless hand-held computer during a communication link.

To further reduce the duration of a download from the middleware system to the wireless hand-held computer during a communication link, the middleware system can also request the wireless mobile hand-held computer to send a statement of health indicator. The statement of health indicator can comprise a file that indicates that a wireless mobile hand-held computer is "healthy." "Healthy" can mean that the wireless mobile hand-held computer is functional and does not have any problems with the application software that may be running on the wireless hand-held computer.

If this statement of health indicator is not detected by the middleware system, this can trigger the middleware system to download larger application software files to the wireless hand-held computer so that the wireless hand-held computer can be "rebuilt" or re-booted. If the statement of health indicator is detected by the middleware system, then the middleware system will not download any large application software to the wireless hand-held computer unless the large application software is an update that the wireless hand-held computer may have not already received. The statement of health indicator can usually be detected by the middleware system and deleted during an upload from the wireless hand-held computer and then a new one can be created and sent to the wireless hand-held computer after a download of files from the middleware system.

Prior to receiving a statement of health indicator during a download of files from the middleware system during a communication link, a wireless hand-held computer can receive a command file from the middleware system. The command file can comprise one or more commands and relative paths for files that are downloaded to the wireless hand-held computer from the middleware system. The command file can executed by the wireless mobile hand-held computer after all the files from the middleware system have been downloaded.

The middleware system can also receive upload files from a wireless mobile hand-held computer even if a statement of health indicator is not detected by the middleware system. This insures that any perishable data that may be generated by a wireless hand-held computer that may not be running correctly can be preserved by the middleware system.

To increase the speed and efficiency of uploads and downloads, the inventive system can also adjust the size of the upload files and download files that are transferred between a wireless mobile hand-held computer and the middleware system using the socket layer. Specifically, the middleware system can break a file into segments and feed it into the socket layer so that the socket layer can process files of a uniform and small size.

To preserve the integrity of each wireless mobile hand-held computer, a wireless hand-held computer can store a back-up or a copy of its application software files and data in case of any errors that could occur during a communication link. These back-up files can be deleted if a communication link is deemed successful.

While the invention may not appear to provide significant advantages on its face when compared to other conventional systems when low volumes of wireless hand-held computers are being served (such as a hundred wireless hand-held computers or less), the invention does offer tremendous advantages in processing power and efficiency when high volumes, such as an order of magnitude of several hundreds of wireless hand-held computers, that can be served by the middleware system. The invention can comprise several elements that contribute to the processing power and efficiency of the middleware system.

For pre-processing of information that is destined for a wireless hand-held computer from a back-end server, such as a legacy system, the middleware system can comprise a distribution engine that can retrieve and receive information from the back-end server. The distribution engine can comprise software running on a computer that communicates with client specific software applications that run on the back-end servers. One example of a client specific software application can include PACE software, that is owned by the assignee of the invention, and described in co-pending U.S. patent application Ser. No. 10/421,639, entitled "Systems and Methods for Providing Field Force Automation in Big Box Retail Environments," filed on Apr. 22, 2003, the entire contents of which are hereby incorporated by reference.

The distribution engine can further comprise hand-held computer logic code that manages the files destined for downloading on a specific or uniquely identified wireless hand-held computer. The distribution engine can further comprise an anticipate application program interface (API) that allows the distribution engine to communicate with the back-end server to retrieve information that is specific to each uniquely identified wireless hand-held computer. The distribution engine can track the files that are specific or tailored for a single wireless hand-held computer by associating files with a unique wireless identifier (ID) assigned to each wireless hand-held computer.

For managing information that is uploaded from a wireless hand-held computer, the middleware system can comprise a triage module that organizes files received from a wireless hand-held computer according to file extensions associated with a particular file. That is, the triage module can assign files to specific queues of a server that contain files of a single type as determined by the file name extension of a file. For example, for image files formatted according to the j-peg standard (.jpg), one or more queues can be assigned to handle files of this type of information. Further, at least two services that manage only one type of file type can be assigned to each individual queue.

This redundancy of services for each individual queue increases the speed in which files are processed and sent back to the back-end server. The redundancy of services can also prevent failures of service for a particular queue since it is unlikely that two or more services out of four services will fail for a particular queue.

The triage module and distribution engine can run on the same physical computer server. These two computer applications can form part of a larger application that can be referred to as the expression engine.

The expression engine comprising the triage and distribution modules can be coupled to an articulation engine through a computer network connection such as through the Internet. The articulation engine can comprise software running on a server that communicates directly with each wireless hand-held computer over the Internet. The articulation engine can comprise the communication submodules for establishing the communication link with each mobile hand-held computer.

According to one aspect of the inventive system, the architecture is designed such that it is flexible yet durable. For example, according to one exemplary aspect, a wireless hand-held computer can access at least one of two articulation engines that may be assigned to a particular wireless hand-held computer. The wireless hand-held computer can access at least one of the articulation engines over a computer network such as the Internet by using computer network address associated with a particular articulation engine, such as an IP address assigned to an articulation engine.

If a particular articulation engine cannot be accessed by a wireless hand-held computer, the wireless hand-held computer can then identify the next articulation engine and its associated computer network address that may be stored in a table on the wireless hand-held computer. In this way, a wireless hand-held computer can be guaranteed a connection with at least one articulation engine that is present in a list of two or more articulation engines.

To add further flexibility of the design and to balance communication loads between articulation engines, according to another exemplary aspect, the wireless hand-held computer can randomly select its articulation engine from the list of articulation engines stored in the wireless hand-held computer to initiate a communication link. And according to a further exemplary aspect, if a first communication link is not successful, the wireless hand-held computer may select the next articulation engine that is adjacent to the randomly selected one. This means that any second or subsequent selection of an articulation engine by the wireless hand-held computer is not random, but sequential in nature.

Similar to the wireless mobile hand-held computer having a list of network addresses for two or more articulation engines that may be assigned to a particular wireless mobile hand-held computer, an articulation engine can also have a list of network addresses for two or more expression engines that may be assigned to a particular articulation engine. According to these exemplary aspects of multiple computer address assignments, the inventive system can balance communications loads across its several articulation engines and expression engines.

The inventive system can handle any type of digital payload that may be exchanged between a wireless mobile hand-held computer and a back-end system. The inventive system can dynamically adjust for receiving new types of upload files produced by the wireless mobile hand-held computer by assigning the new types of upload files to respective new upload queues. The middleware system can also initiate new services that are assigned to and process the respective new upload queues for any new types of digital payload.

DETAILED DESCRIPTION OF EXEMPLARY EMBODIMENTS

Figure 1:
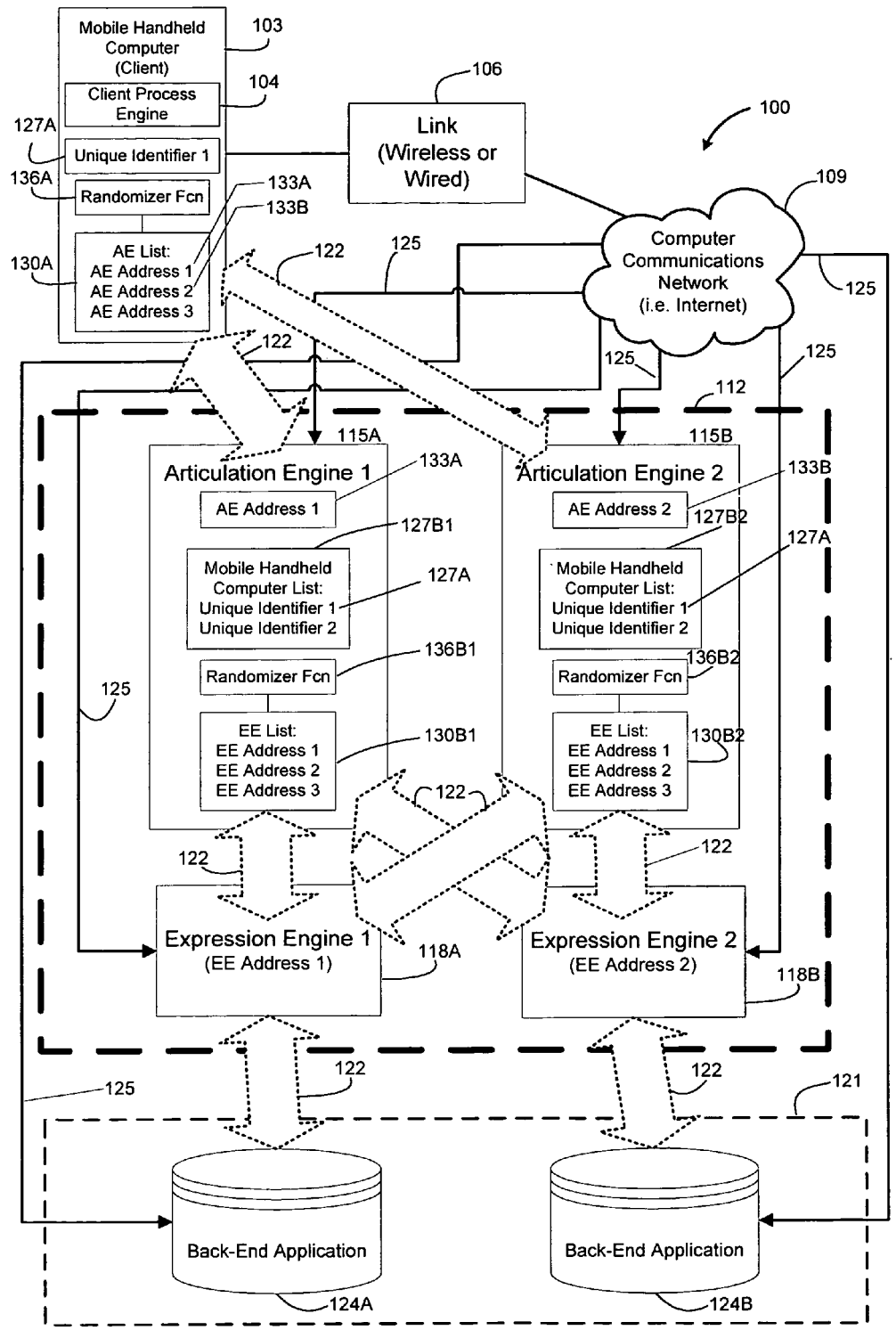
FIG. 1 is a functional block diagram of some core architectural components for a middleware system that communicates data between wireless mobile hand-held computers and a back-end computer system according to one exemplary embodiment of the invention.

The invention may be embodied in hardware or software or a combination thereof. The invention can be characterized as an asynchronous, middleware system positioned between a larger computer system and a wireless mobile hand-held computer that anticipates the needs of the wireless mobile hand-held computer that is served by the middleware system. The inventive middleware system can anticipate and process needs for a mobile hand-held computer when the hand-held computer is not "synchronized" with a larger computer network.

According to a further exemplary aspect, the middleware system can be designed so that the wireless mobile hand-held computers are not always trying to establishing a communications link with the back-end computer system. The inventive middleware system can be designed to take advantage of the fact that most applications on a hand-held computer do not need a constant or frequent communications link with the back-end computer system.

The inventive system can handle any type of digital payload that may be exchanged between a wireless mobile hand-held computer and a back-end system. The inventive system can dynamically adjust for receiving new types of upload files produced by the wireless mobile hand-held computer by assigning the new types of upload files to respective new upload queues. The middleware system can also initiate new services that are assigned to and process the respective new upload queues for any new types of digital payload.

Referring now to the drawings, in which like numerals represent like elements throughout the several Figures, aspects of the invention and the illustrative operating environment will be described.

FIG. 1 is a functional block diagram that illustrates some architectural components for an inventive middleware system 100 that communicates data between wireless mobile hand-held computers 103 and a back-end computer system 121 according to one exemplary embodiment of the invention. The exemplary computer architecture of middleware system 100 can comprise a client process engine 104 running on a mobile hand-held computer 103, a listener tier 112 coupled to a computer network 109, and a back-end computer system 121.

The middleware system 100 may operate in a networked environment using logical connections to one or more other remote computers. The remote computers may be another personal computer, such as hand-held computers 103, a server, a client such as web browser, a router, a network PC, a peer device, or a common network node. The logical connections depicted in FIG. 1 can include additional local area networks (LANs) and a wide area networks (WANs) not shown. Such networking environments are commonplace in offices, large industrial facilities, enterprise wide computer networks, intranets, and the Internet.

Computers illustrated in FIG. 1 may be coupled to a LAN through a network interface or adaptor. When used in a WAN network environment, the computers may typically include a modem or other means for establishing direct communication lines over the WAN.

In a networked environment, program modules may be stored in remote memory storage devices. It will be appreciated that the network connections shown are exemplary and other means of establishing a communications link between computers other than depicted may be used.

Moreover, those skilled in the art will appreciate that the present invention may be implemented in other computer system configurations, including other hand-held devices besides hand-held computers, multiprocessor systems, microprocessor based or programmable consumer electronics, networked personal computers, minicomputers, mainframe computers, and the like.

The invention may be practiced in a distributed computing environment as illustrated in FIG. 1, where tasks may be performed by remote processing devices that are linked through a communications network such as the distributed computer network 109. In a distributed computing environment, program modules may be located in both local and remote storage devices.

The mobile hand-held computer 103 can comprise any general purpose computer capable of running software applications and that is portable for mobile applications. The mobile hand-held computer 103 can communicate with the computer network 109 through a link 106. Further details of the client process engine 104 running on the mobile hand-held computer 103 will be described below with respect to FIG. 3.

The communications link 106 can be wire or wireless, depending upon the application of the mobile hand-held computer 103. In a preferred, yet exemplary embodiment, the link 106 can comprise a wireless link. Typical wireless links include a radio frequency type in which the mobile hand-held computer 103 can communicate with other devices using radio frequency (RF) electromagnetic waves. Other wireless links that are not beyond the scope of the invention can include, but are not limited to, magnetic, optical, acoustic, and other similar wireless types of links.

The communications link 106 allows the mobile hand-held computer 103 to communicate with the computer network 109. According to one exemplary aspect, the client process engine 104 can be programmed to initiate the communications link 106 at predetermined times during the day or at set predetermined time intervals. The client process engine 104 can also initiate the communications link 106 if it determines that it has data that the back-end computer system 121 should have prior to a scheduled communications link 106. Similarly, the back-end computer system 121 can initiate the communications link 106 if it determines that it has data that the back-end computer system 121 should have prior to a scheduled communications link 106. By only initiating a communications link 106 only when data is ready to be transmitted, the inventive middleware system 100 can take advantage of processing information during any "down" time or time in which the hand-held computer is "off-line" or not linked to the back-end computer system 121. Scheduling only periodic links 106 can also conserve costs that are associated with wireless networks and "air-time."

The computer network 109 can comprise any type of computer network such as a local area network (LAN), wide area network (WAN), or the Internet. The computer network 109 can be coupled to the listener tier 112 of the exemplary computer architecture. The listener tier 112 is designed to transmit data to and receive data from the mobile hand-held computer 103 across the computer network 109. The listener tier 112 can comprise one or more articulation engines 115 and expression engines 118.

Each articulation engine 115 is designed to communicate data between each mobile hand-held computer 103 and a respective expression engine 118. Further details of the articulation engine will be described below with respect to FIG. 3. The expression engine 118 that is coupled to one or more articulation engines 115 communicates data between a respective articulation engine 115 and the back-end computer system 121.

Each articulation engine 115 can comprise a computer server that executes various software applications for communicating with the mobile hand-held computer 103 and the expression engine 118. Further details of the expression engine 118 will be described below with respect to FIG. 5. The expression engine 118 can comprise a computer server such as a sequential query language (SQL) server that maintains upload and download files for each respective mobile hand-held computer 103 that may be assigned to a particular expression engine 118. The expression engine 118 is designed to communicate between the articulation engine 115 and the back-end computer system 121.

While the articulation engine 115 and expression engine 118 are illustrated as communicating with one another through dashed arrows 122, the arrows denote virtual connections between the articulation engines 115 and expression engines 118 and not direct physical connections. That is, each expression engine 118 is connected to one or more articulation engines 115 through the computer network 109 as indicated by solid, direct-link, lines 125. Further, while each listener tier 112 comprises a group of articulation engines 115 and expression engines 118 contained within a rectangular box, one of ordinary skill in the art recognizes that this grouping of elements is a logical association rather than an actual physical one. For example, the first articulation engine 115A could physically exist in a first geographic location, such as the State of Georgia, while the second articulation engine 115B could exist in a second geographic location, such as the State of Maryland. The physical locations of the expression engines 118 can also be different from one another as well as different from the articulation engines 115.

The expression engines 118 connect the articulation engines 115 to back-end computer systems 121. The back-end computer systems 121 can further comprise various application-specific software that may run on larger computers such as servers 124. For example, a back-end server 124 can execute application software that is specific to an industry such as construction, large-scale contracting, and/or a sales environment. In a construction application, the back-end servers 124 could be designed to track the progress of a construction project through the mobile hand-held computers 103 that are in the hands of the employees of a particular company. Similarly, the back-end servers 124 could execute software applications that track the sales or marketing activities of employees who use the mobile hand-held computers 103 while they are making sales calls with customers in a non-office, on-site setting.

With the inventive middleware system 100, a balanced communication load and relative ease in maintaining the middleware system 100 can be achieved. Specifically, according to one exemplary aspect, each mobile hand-held computer 103 has a unique identifier 127A that is assigned to a particular group of articulation engines 115. Prior to establishing a link 106 with the computer communications network 109, the mobile hand-held computer 103 through the client process engine 104 can select one of several computer addresses from a list 130A of computer network addresses. The list 130A of computer addresses can comprise computer addresses of the articulation engines 115 that are assigned to a particular mobile hand-held computer 103.

The computer addresses can comprise addresses such as Internet Protocol (IP) addresses. For example, the client process engine 104 could select the first computer network address 133A that is the computer network address for the first articulation engine 115A as illustrated in FIG. 1. Similarly, the client process engine 104 could also select the second computer network address 133B that corresponds to the computer network address for the second articulation engine 115B. The invention could include any number of computer network addresses that are contained in the list 130A.

To assist with balancing the communication between respective articulation engines 115 such as the first articulation engine 115A and the second articulation engine 115B, the client process engine 104 of the hand-held computer 103 can use a randomizer function 136 that allows the mobile hand-held computer 103 to select its first articulation engine 115 prior to establishing a link 106 with the computer communications network 109.

According to one exemplary embodiment, the client process engine 104 can use the randomizer function 136A in order to select a first computer network address out of the list 130A of computer network addresses available to a particular mobile hand-held computer 103. This means that if a particular computer network address is first selected by a mobile hand-held computer 103 and it fails, the client process engine 104 can then select the next computer network address from the list 130A in sequence instead of using the randomizer function 136A.

However, it is not beyond the scope of the invention for the client process engine 104 to use the randomizer function 136A for selecting each computer network address from the list 130A of network addresses. The inventors have discovered that selecting a first computer network address randomly and then selecting a next computer address in sequence from the list 130A can help balance the communication load between respective articulation engines 115 of a particular listener tier 112 that may be assigned to a group of mobile hand-held computers 103.

Allowing each mobile hand-held computer 103 to select a respective articulation engine 115 from the list 130A of computer network addresses also increases the stability of the middleware system 100. For example, if a particular articulation engine 115 requires servicing, then that particular articulation engine 115 can be taken offline without service disruption for a particular mobile hand-held computer 103. In other words, if a mobile hand-held computer 103 selects a first computer network address 133A that may be assigned to a first articulation engine 115A and if the first articulation engine 115A is offline, then the mobile hand-held computer 103 can select the next computer network address from the list 130A of the computer network addresses. In this way, the next articulation engine 115 that is selected could be the second articulation engine 115B.

Similar to the computer network addresses 130A maintained within the mobile hand-held computer 103, each articulation engine 115A may also maintain a list 130B of computer network addresses for respective expression engines 118 that are assigned to a particular articulation engine 115. Like the mobile hand-held computer 103, the articulation engine 115A can also use a randomizer function 136B to randomly select its first computer network address from the list 130B of computer network addresses for its respective expression engines 118.

In this way, communication load balancing can be achieved between numerous expression engines 118 that may service one or more articulation engines 115. And as noted above, it is not beyond the scope of the invention to utilize the randomizer function 136B for each selection that is made from the list 130B of computer network addresses. And similar to what is described above, if service or maintenance is required for a particular expression engine 118, a particular unit may be taken offline without affecting communications because of the articulation engine's 115 ability to select another expression engine 118 from the list 130B of computer network addresses maintained by a respective articulation engine 115.

In summary, the first and second lists 130A, 130B that are maintained in respective mobile hand-held computers 103 and respective articulation engines 115 in the listener tier 112 increase performance of the middleware system 100 by providing automatic fail-over in addition to communication load balancing. The ease at which a mobile hand-held computer 103 can identify an available articulation engine 115 as well as the ability of the articulation engine 115 being able to find an available expression engine offers a very scalable and durable middleware system 100.

The middleware system 100, as illustrated in FIG. 1, also provides simple communications between a respective articulation engine 115 and a mobile hand-held computer 103. Specifically, the articulation engine 115 does not typically perform any significant or rigorous authentication of respective mobile hand-held computers 103 that may be serviced by a particular articulation engine 115. Instead of checking through several layers of security to determine if a particular mobile hand-held computer 103 is permitted to access the back-end computer system 121, according to one exemplary embodiment, the articulation engine 115 can usually authenticate a wireless mobile hand-held computer 103 by comparing the hand-held computer identifier 127A that is sent by the mobile hand-held computer 103 with the stored unique identifier 127B that is maintained in the articulation engine 115.

If the two unique identifiers 127A and 127B match, then the articulation engine 115 has authenticated the wireless mobile hand-held computer 103 and, therefore, the articulation engine 115 can proceed with communicating with the respective mobile hand-held computer 103. However, one of ordinary skill in the art recognizes that one or more additional layers of security could be implemented by the articulation engine without significantly affecting the simple communications that are established between the mobile hand-held computer 103 and a respective articulation engine 115.

Figure 2:
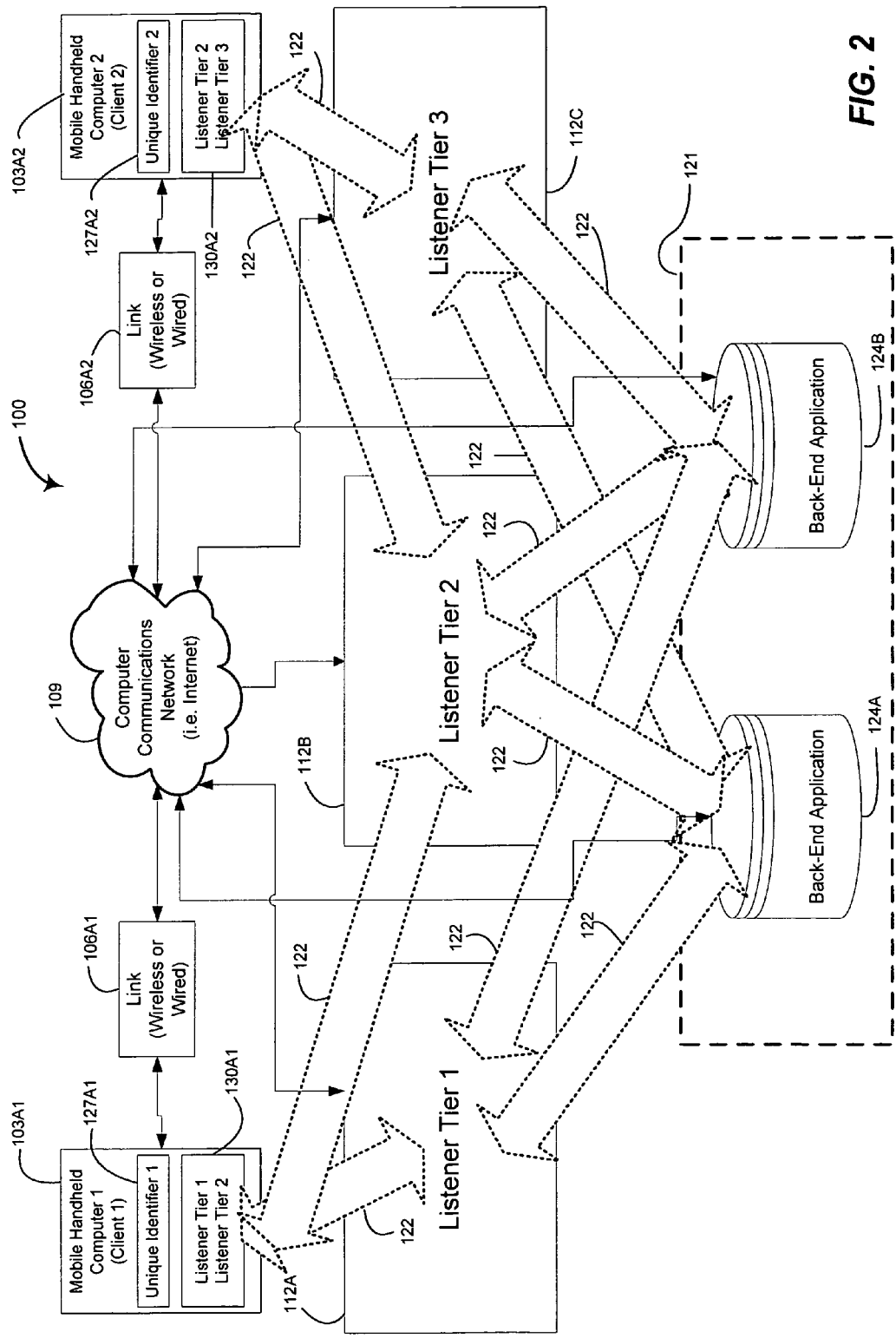
FIG. 2 is a functional block diagram illustrating scalability of some core architectural components for a middleware system that communicates data between wireless mobile hand-held computers and a back-end computer system according to one exemplary embodiment of the invention.

Referring now to FIG. 2, this figure is a functional block diagram illustrating additional scalability of some core architectural components for the middleware system 100 that communicates data between wireless mobile hand-held computers 103 and a back-end computer system 121 according to one exemplary embodiment of the invention. In this figure, the first mobile hand-held computer 103 can be assigned to a first listener tier 112A. Similarly, a second mobile hand-held computer 103B can be assigned to a second listener tier 112B.

Additional listener tiers 112, such as third listener tier 112C, can be added to the middleware system 100 in order to provide redundancy for other existing listener tiers 112. According to another exemplary embodiment, a mobile hand-held computer 103 can be assigned to one or more listener tiers 112. For example, the first mobile hand-held computer 113A can be assigned to two listener tiers 112 such as the first listener tier 112A and the second listener tier 112B. In this way, the mobile hand-held computer 103 will always likely be able to establish a link 106 with one or more listener tiers 112. Each of the articulation engines 115 and expression engines 118 in respective listener tiers 112 usually are assigned a single computer network address such as an interne protocol (IP) network address.

Figure 3:
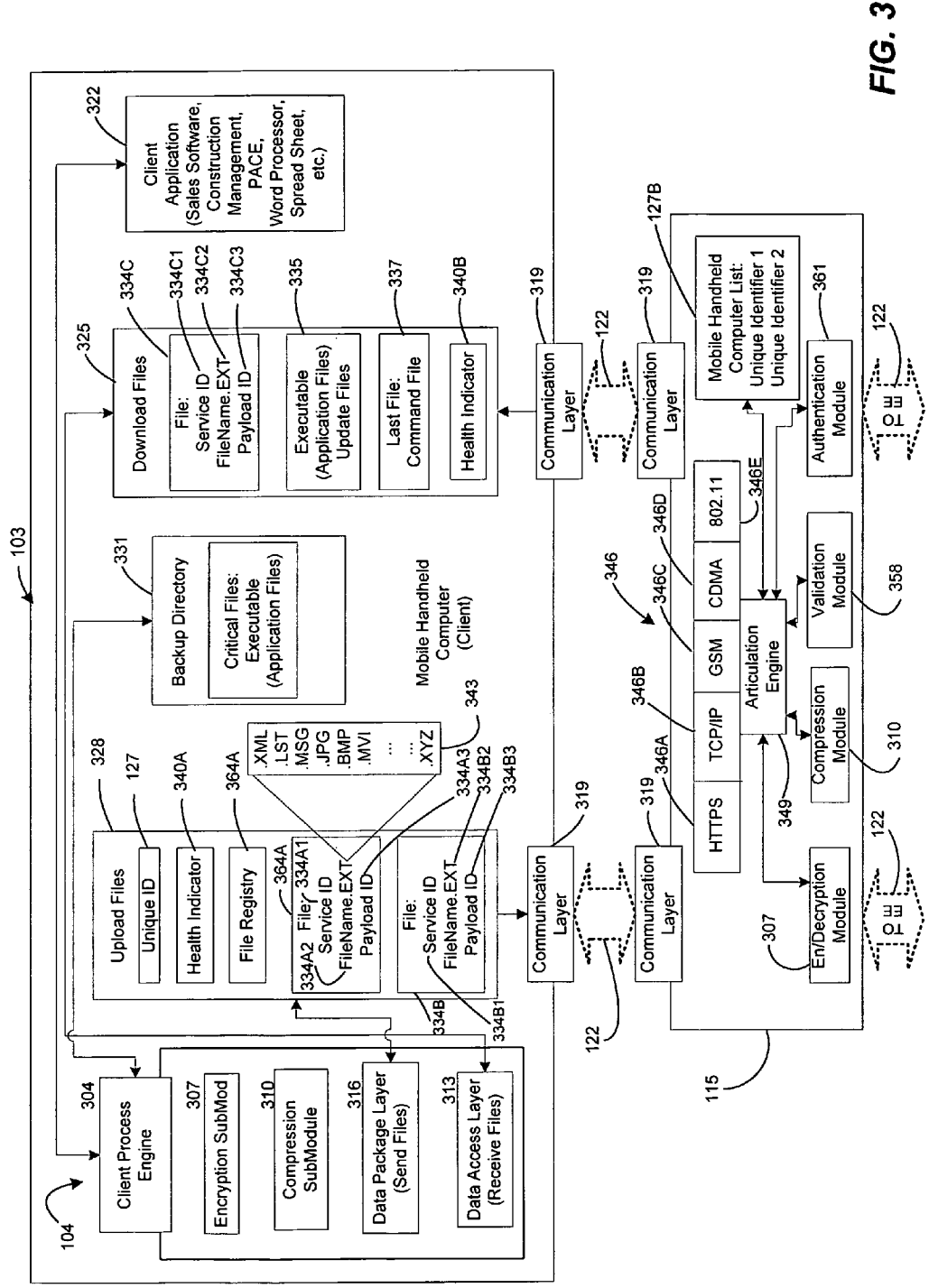
FIG. 3 is a functional block diagram illustrating some software architecture for a wireless mobile hand-held computer and an articulation engine according to one exemplary embodiment of the invention.

Referring now to FIG. 3, this figure is a functional block diagram illustrating some software architecture for a wireless mobile hand-held computer 103 and an articulation engine 115 according to one exemplary embodiment of the invention. The mobile hand-held computer 103 can support one or more computer modules such as the client process engine 104 and a client application 322. In fact, the wireless mobile hand-held computer 103 can support multiple client applications 322. Some client applications 322 can include, but are not limited to, calendaring software, email software, spreadsheet software, word processing software, digital photography software, graphical drafting software, and other like software applications. For example, one client application can include PACE software, that is owned by the assignee of the invention, and described in co-pending U.S. patent application Ser. No. 10/421,639, entitled "Systems and Methods for Providing Field Force Automation in Big Box Retail Environments," filed Apr. 22, 2003, the entire contents of which are hereby incorporated by reference.

The client process engine 104 can further comprise a main client process engine module 304, an encryption submodule 307, a compression submodule 310, a data access layer submodule 313, and a data package layer submodule 316. The encryption submodule 307 can encrypt data that is to be sent to the back-end computer system 121 as well as decrypt data that may be received from the back-end computer system 121. The compression submodule 310 can compress data that is to be sent to the back-end computer system 121 as well as uncompressing data that may be received from the back-end computer system 121. Conventional compression and encryption algorithms known to one of ordinary skilled in the arts can be employed for the respective encryption submodule 307 and compression submodule 310.

The data access layer submodule 313 can process files that may be received from the back-end computer system 121. Similarly, the data package layer 316 can organize the files that are to be transmitted from the mobile hand-held computer 103 to the back-end computer system 121.

The client process engine 104 works similar to the expression engine module 118. The expression engine 118 will be described in further detail below. As the client application 322 running on the wireless hand-held computer 103 captures data, the client process engine 104 is designed to collect and package any of this data that needs to be uploaded in the uploads file directory 328. The client process engine submodule 304 uses the encryption module to encrypt any of the data as needed. The client process submodule 304 also uses the compression module 310 to compress data as needed. The overall function performed by the entire client process engine 104 for uploads is transforming and staging data in the correct context that is understood by an articulation engine 115. For downloads, the overall function performed by the entire client process engine 104 is pushing out the received files to the right locations within the wireless hand-held computer 103 for use by the client application 322.

The mobile hand-held computer 103 through the client process engine submodule can maintain and prepare files that will be sent to the back-end computer system 121 in a upload files directory 328. Typically, when the mobile hand-held computer 103 establishes a communication fink 106 with an articulation engine 115, the files in the upload directory 328 are usually sent to the articulation engine 315 first. After all the files have been uploaded from the upload file directory 328 to the articulation engine 115, the mobile hand-held computer 103 then can receive files for downloading into the download files directory 325 from the articulation engine 115 of the middleware system 100.

The upload files directory 328 can contain several different types of files that are to be sent to the articulation engine 115 and ultimately the back-end computer system 121. In the upload files directory 328, the mobile hand-held computer 103 can maintain its unique identifier 127, the file registry that lists all of the files contained in the uploads files directory 328, a health indicator 340A, and one or more data files 334. The health indicator 340 can be used by the articulation engine 115 in order to determine if the mobile hand-held computer 103 is in a satisfactory or "healthy" state.

The statement of health indicator 340 can comprise any type of file such as a time stamped file. However, other types of files are not beyond the invention. According to one exemplary embodiment, the type or content of the health indicator 340 is not important, rather, it's presence or lack thereof is how the articulation engine 115 can determine if a particular mobile hand-held computer 103 is in a healthy state. A healthy state can mean that the wireless mobile hand-held computer 103 is functional and did not encounter any problems with the application software 322 that may be running on the wireless mobile hand-held computer 103.

As noted above, the file registry 364 can be created and updated to reflect every file that may be present in the upload directory 328. This file registry 364 can be one of the first files that the articulation engine 115 reviews and forwards on to the expression engine 118 in order to determine what files in the upload directory 328 may be needed or desired by the expression engine 118. After reviewing a particular file registry 364 against a file registry 364B that is maintained by the expression engine 118, the expression engine 118 can request the articulation engine 115 to initiate an upload for particular files that the expression engine 118 has not received from a previous communication link 106 with the mobile hand-held computer 103.

The file registry 364A maintained by the mobile hand-held computer 103 can also indicate what files the mobile hand-held computer 103 has received from the articulation engine 115 and ultimately the expression engine 118. The expression engine 118 can also determine what files may be needed by the mobile hand-held computer 103 after comparing the file registry 364A sent by the mobile hand-held computer 103 with the file registry 364B that is maintained by the expression engine. By comparing the file registry 364A that is maintained by the mobile hand-held computer 103 with the file registry 364B maintained by the expression engine 118, any unnecessary and duplicate uploads and downloads of files can be eliminated. This, in turn, can reduce the duration of downloads from the middleware system 100 to the wireless hand-held computer 103 and the duration of uploads from the mobile hand-held computer 103 to the middleware system 100 during a communication link 106.

The data files 334 that can be uploaded to or downloaded from the articulation engine 115 can comprise files that can be used by the client application software 322. In addition to data files that can be used by the client application software 322 running on the mobile hand-held computer 103, the download files directory 325 can also manage downloaded executable files 335 that may comprise additional client application software or one or more updates to existing client application software 322 running on the mobile hand-held computer 103.

Each data file 334 can comprise a service identifier 334A, a file name 334A2, and a payload identifier 343A3. The service identifier 334A1 can refer to one or more software services that handle specific file types as will be discussed in further detail below in FIG. 6. The file name 334A2 can identify a data file with a unique file name as well as with a unique file extension 343.

The inventive middleware system 100 places an emphasis on file extensions 343 as a tool for managing and processing files 334 quickly and efficiently. The file extension 343 typically comprises three alpha-numeric characters that are readily known to one of ordinary skilled in the art. For example, XML files can utilize the ".xml" file extension while a message or text based file can utilize the ".msg". Other file extensions to indicate various types of files such as J-PEG files, bit-map files, video files, and the like are known to one of ordinary skilled in the art.

The invention is not limited to any specific three character file extension and new extensions can be created and used as different client application 322 will permit. Further, it is contemplated that longer file extensions 343 greater than three characters may be used in the future as permitted by client application software 322 running on the mobile hand-held computer 103. A further description of how the file extensions 343 are used by the inventive middleware system 100 to increase processing speed of filed both during and after a communication link is further described below with respect to FIG. 6.

As previously indicated, one of the first files uploaded or transferred from the mobile hand-held computer 103 to the articulation engine 115 is the statement of health indicator 340A. If the statement of health indicator 340A is not detected by the articulation engine 115, this can trigger the articulation engine 315 to download larger application software files, such as executable client applications, to the mobile hand-held computer 103 so that the mobile hand-held computer 103 can be "rebuilt" or re-booted. If the statement of health indicator 340A is detected by the articulation engine 115, then the articulation engine 115 will not download any large application software 322 to the mobile hand-held computer unless the large application software 322 is an update that the wireless hand-held computer 103 may not already have in its possession.

The statement of health indicator 340A can usually be detected by the articulation engine 115 and the deleted just prior to an upload from the wireless mobile hand-held computer 103. A new health indicator or second health indicator 340B can be issued and sent to the wireless mobile hand-held computer 103 after a completed download of files from the articulation engine 115.

According to one exemplary aspect, the inventive middleware system 100 can receive upload files 334 from a wireless mobile hand-held computer 103 even if a statement of health indicator 340A is not detected by the articulation engine 115. This exemplary feature can insure that any perishable data that may be generated by a wireless hand-held computer 103 that is not running correctly can be preserved by the middleware system 100.

Prior to receiving a new statement of health indicator 340B during a download of files from the articulation engine 115, the wireless mobile hand-held computer 103 can receive a command file 337 from the articulation engine 115. The command file 337 can comprise one or more commands and relative paths for previous data files 334 that may be downloaded to the mobile wireless hand-held computer 103 from the articulation engine 115. The command file 337 can be executed by the wireless mobile hand-held computer 103 after all the files from the articulation engine 115 have been downloaded to the mobile hand-held computer 103.

The mobile hand-held computer 103 can further comprise a backup directory 331 that can be used to store backup files for specific programs. For example, the backup directory 331 can comprise critical client executable files to support client applications 332 that may be running on the mobile hand-held computer 103. This backup directory 331 can be very important when download files containing executable files 335 are being transferred from the articulation engine 115 to the mobile hand-held computer 103. If an executable file 335 is incorrectly downloaded or encounters an error while it is attempted for execution, the mobile hand-held computer 103 can retrieve any critical client application software from the backup directory so that the mobile hand-held computer 103 can maintain itself in a functional state as it existed prior to a particular download from the articulation engine 115.

The critical files in the backup directory 331 can be deleted if a communication link 106 and execution of critical executable files 335 are deemed successful by the mobile hand-held computer 103. While the use of a file registry 364 and organizing and processing data files 334 by extensions 343 can increase the efficiency and speed in which data is communicated between the articulation engine 115 and the mobile hand-held computer 103 during a communication link 106, the inventive middleware system 100 can further comprise a communication layer link 319 that can assist in the processing of uploaded files to and downloaded files from the articulation engine 115. Further details of the communication layer link 319 will be described below with respect to FIG. 4.

The mobile hand-held computer 103 as illustrated in FIG. 3 can be linked with the articulation engine 115. While a virtual connection between the mobile hand-held computer 103 and articulation engine 115 is indicated with dashed arrows 122, one of ordinary skill in the art recognizes that this virtual connection is not the same as the direct connection provided by the wireless communication link 106 as illustrated in FIG. 1.

As noted above, when a communication link 106 is established, it allows for the virtual connection as indicated by dashed arrows 122. The articulation engine 115 typically receives files from the uploads directory 328 of the mobile hand-held computer 103. To communicate with the mobile hand-held computer 103, the articulation engine 115 can comprise several different communication modules and support various types of protocols. For example, the communication modules 346 can comprise a first submodule 346A for handling HTTPS protocol, a second submodule 346B for handling TCP/IP protocol, a third submodule for handling Global Systems for Mobile communications (GSM) type communications, a fourth submodule 346D for handling code division multiple access (CDMA) protocols, and a submodule 346E for processing radio-frequency based LAN protocols, such as the 802.11 type protocol.

In addition to the various types of communication protocols 346, the articulation engine 115 can further comprise a main articulation module 349 that manages other submodules in addition to the communications submodule 346. The main articulation engine module 349 can monitor and engage an encryption submodule 307, a compression submodule 310, a validation submodule 358 and an authentication submodule 361. The encryption submodule 307 and the compression submodule 310 can be similar to the encryption submodule 307 and compression submodule 310 that are contained within the mobile hand-held computer 103.

The validation submodule 358 and the authentication submodule 361 can manage and maintain a listing 367 of unique IDs 127 of hand-held computers 103 that are permitted access to the articulation engine 115 and associated expression engine 118. As noted above, the middleware system 100 does not typically perform any rigorous authentication of the wireless mobile hand-held computer 103. Instead, the articulation engine 115 and specifically the validate submodule 358 and authenticate submodule 361 of the articulation engine 115 can authenticate a wireless hand-held computer 103 by comparing the wireless hand-held computer identifier 127A that is unique to the wireless hand-held computer 103 and stored by the middleware system with the identifier that is submitted by the wireless hand-held computer 103. If these two identifiers 127 match, the wireless mobile hand-held computer 103 can be authenticated by the articulation engine 115.

Specifically, the authenticate submodule 361 firsts determines if the wireless hand-held computer identifier 127A should be granted access to the network at the network level. If the authenticate submodule 361 grants access based on the wireless hand-held computer identifier 127A, the validate submodule 358 then checks at the applications layer whether the wireless hand-held computer 103 is a known device. The validate submodule 358 identifies the application context within which the expression engine 118 understands the wireless hand-held computer 103.

Figure 4:
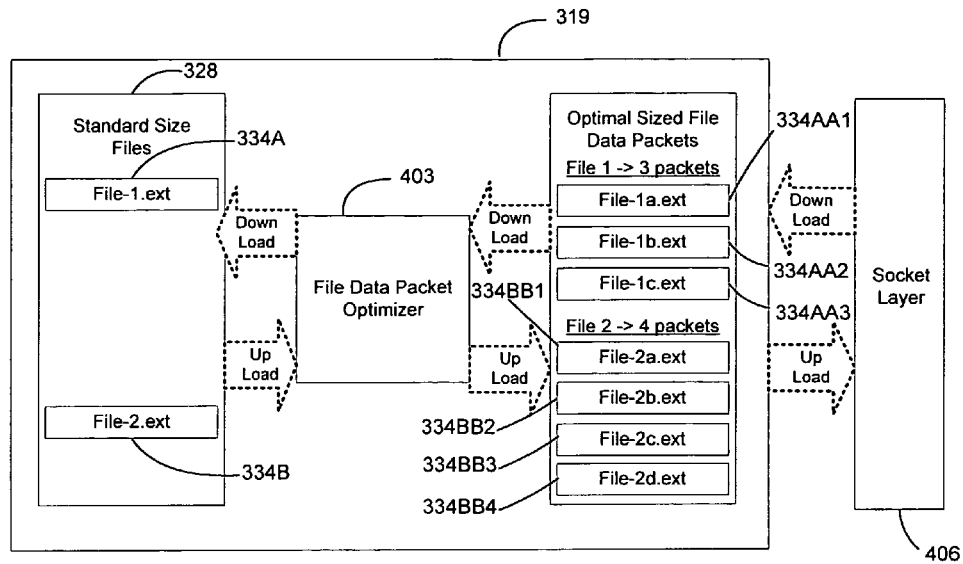
FIG. 4 is a functional block diagram illustrating a communication layer link according to one exemplary embodiment of the invention.

Referring now to FIG. 4, this figure is a functional block diagram illustrating a communication layer link 319 that resides on both the mobile hand-held computer 103 and the articulation engine 115. The communication layer link 319 can increase the speed and efficiency of uploads and downloads between the mobile hand-held computer 103 and the articulation engine 115 during a communication link 106. The communication layer link 319 can adjust the size of upload files and download files that are transferred to the socket layer 406 for communications between the wireless mobile hand-held computer 103 and the articulation engine 115.

Specifically, the communication layer link 319 can break a file into segments and feed it into the socket layer 406 so that the socket layer 406 can process the files of both a uniform and a smaller size. The communication layer link 319A can comprise a file data packet optimizer 403 that can retrieve files 334 from the upload directory 328 and break these files 334 into uniform groups of packets 334AA, 334BB. These optimally sized packets of data 334AA, 334BB can be fed into the socket layer 406 that can establish the communication link 106 between the mobile hand-held computer 103 and the articulation engine 115.

The socket layer 406 has a check-sum function that can guarantee that the packet for a particular file have been received by a particular end of the socket layer 406, as known to one of ordinary skill in the art. By using the file data packet optimizer 403, it is possible to stop an uploaded file at any point during the upload and then to restart the upload at the point in which the previous process of uploading was stopped. This also holds true for any files that may be downloaded through the socket layer 406 because the articulation engine 115 also has a communication layer link 319 that optimizes the size of packets of the download files sent to the mobile hand-held computer 103.

The file data packet optimizer 403 can automatically adjust to the type of communication link 106 established between the mobile hand-held computer 103 and the articulation engine 115. That is, the file data packet optimizer 403 can automatically identify the optimal size of packets for a wireless communication link 106 as well as for a wired communication link 106 in which there is a direct electrical connection between the mobile hand-held computer 103 and the articulation engine 115. It is recognized that on an occasion, the user of a mobile hand-held computer 103 could have access to a wired link 106 for communicating with the articulation engine 115 instead of using a wireless connection.

In this wired context, the file data packet optimizer 403 can identify the appropriate size of packet data that can be sent through the socket layer 406 in order to increase communication efficiency and speed between the mobile hand-held computer 103 and the articulation engine 115. Basically, to one of ordinary skill in the art, the file data packet optimizer 403 of the communication layer link 319 functions as a cashe for the socket layer 406.

In other words, the file data packet optimizer 403 can tune the size of file packets that are sent to the socket layer 406 for optimal throughput and also to resume state for any file that is incompletely transmitted. Regarding the function of resuming state, in instances where a file is not completely transmitted, such as if the link 106 is broken between the wireless hand-held computer 103 and the network 109, it would be unnecessary to start at the beginning of that file after a first transmission of the file that may not comprise a complete transmission. Stated differently, the file data packet optimizer 403 allows check-sum restart within file.

The file data packet optimizer, according to one exemplary aspect, can comprise a data management module that maintains a history of file state for upload and download files so that on subsequent connections in which a link 106 is re-established, the file data packet optimizer 403 can pick up transmission where it stopped previously. According to another exemplary aspect, files sizes are kept at a minimum so that the file data packet optimizer 403 can readily re-start a second transmission of a file after a short break in a first transmission.

Figure 5:
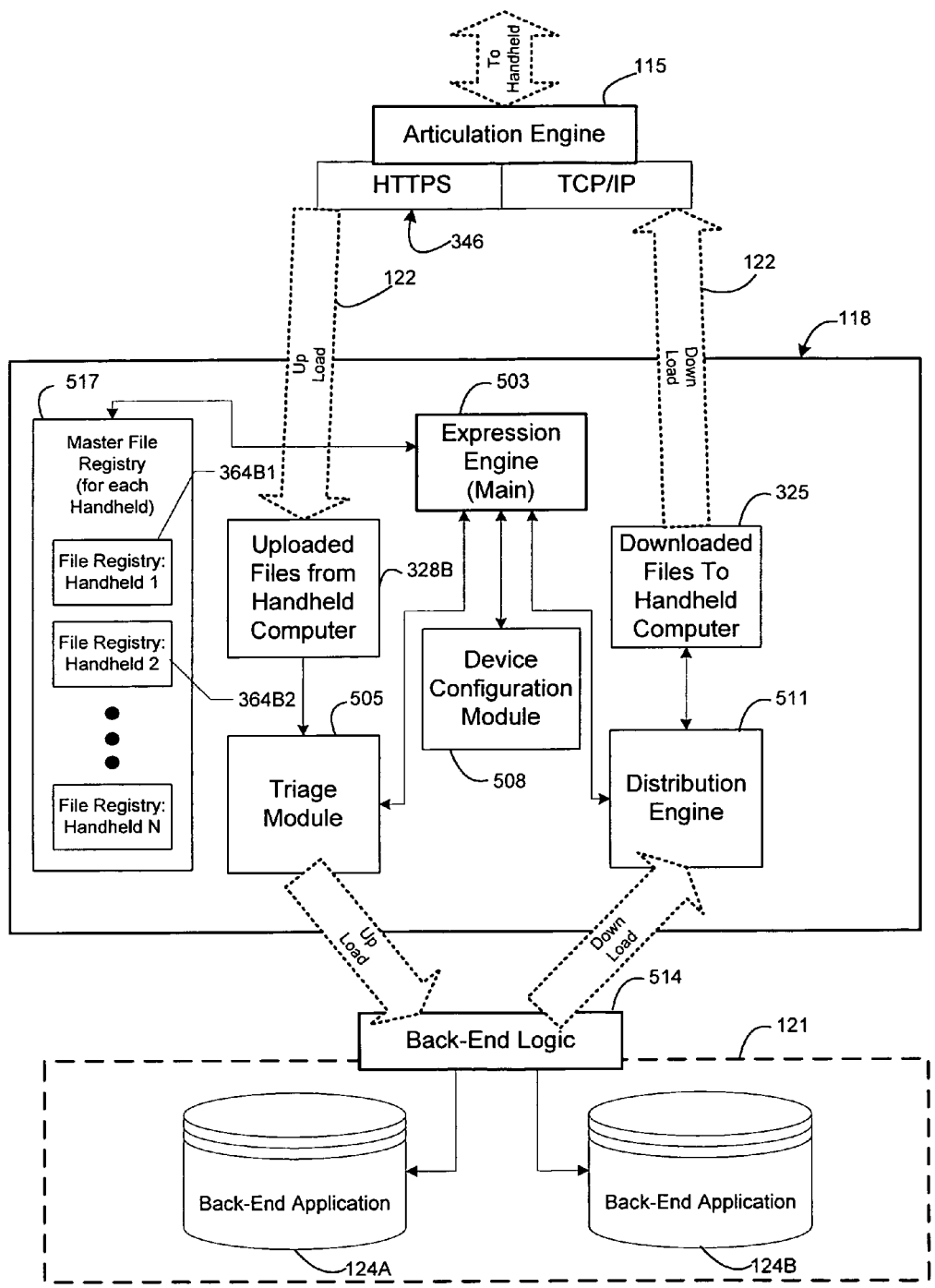
FIG. 5 is a functional block diagram illustrating an articulation engine and further details of an expression engine according to one exemplary embodiment of the invention.

Referring now to FIG. 5, this figure is a functional block diagram illustrating an articulation engine 115 and further details of an expression engine 118 according to one exemplary embodiment of the invention. The articulation engine 115 can be coupled to a respective expression engine 118 through a virtual connection 122 as indicated by dashed arrows 122 in FIG. 5. As noted previously, the virtual connection as indicated by dashed arrows 122 can be a connection that is established by a communication link between the articulation engine 115 and the expression engine 118 over the computer communications network 109 as illustrated in FIG. 1. The expression engine 118 can comprise several different computer modules such as a main expression engine module 503 that can manage a hand-held device configuration module 508, a triage module 505, and a distribution engine 511.

The triage module 505 is responsible for managing any upload files received from a wireless mobile hand-held computer 103 that is associated with any respective articulation engine 118. Further details on how the triage upload module 505 manages and processes the upload files 328 received from the mobile hand-held computer 103 will be discussed in further detail below with respect to FIG. 6.

Another computer module managed by the main expression engine module 503 is a distribution engine 511. A distribution engine 511 is responsible for tracking the download files in a download directory 325 that contains the files that are intended for a particular wireless mobile hand-held computer 103. The distribution engine 511 can further manage a list of registries 517 that contain individual file histories 364 for respective wireless hand-held computers 103. Further details of the distribution engine 511 will be described below with respect to FIG. 7.

The expression engine 118 can further comprise the hand-held device configuration module 508 that can assist in managing and organizing the download files in download directory 325 that may be assigned to a particular mobile hand-held computer 103.

The distribution engine 511 can comprise an API that has logic that understands the needs of the back-end applications 124 running on the back-end server 121 and expresses the needs to the download files module 325 destined for each wireless hand-held computer 103. Further details of the distribution engine will be described below in FIG. 7. The expression engine submodule 503 can comprise logic to understand what data is destined for a particular wireless hand-held computer 103. The expression engine submodule 503 can also comprise logic that formats the data for the download files 325 destined for a particular wireless hand-held computer 103.

The expression engine submodule 503 can also alert a particular wireless hand-held computer 103 that it has files to download for that wireless hand-held computer 103 based on a date and time the data is "expressed-out" in the downloads files 325 for transmission to each wireless hand-held computer 103. The overall function performed by the entire expression engine module 118 is transforming and staging data in the correct context that is understood by the device intended to receive the data, which is either a wireless hand-held computer 103 or a back-end server 121 running specific back-end applications.

The device configuration module 508 is responsible for validation. The device configuration module 508 checks the unique wireless hand-held computer identifier 127A and determines the back-end applications 124 that are associated with that device. The device configuration module 508 can comprise logic that determines how data should be sent to the wireless hand-held computer 103. The configuration module 508 can also track the version of software running on each wireless hand-held computer 103.

Both the distribution engine 511 and the triage module 505 communicate with the back-end logic 514 that may exist above or adjacent to the back-end computer systems 121. The back-end logic 514 residing in or adjacent to a back-end computer system 121 can identify download files that should be received by a particular mobile hand-held computer 103.

The back-end logic 514 can determine how to package information as a download file that may acceptable to a mobile hand-held computer 103 and the module 514 may also determine what types of users of mobile hand-held computers may need specific information. The back-end logic 514 repackages information received from the back-end computer system 121 and distributes it to the distribution engine 511. Both the expression engine 118 and the back-end computer system 121 can comprise large computer systems such as sequential query language servers (SQL) servers that can comprise one or more SQL files. The device configuration module 508 through the expression engine 118 can organize the mobile hand-held computers 103 by role, by group, by territory and any other fashion depending upon the needs or specific applications being executed on the back-end computer system 121.

Figure 6B:
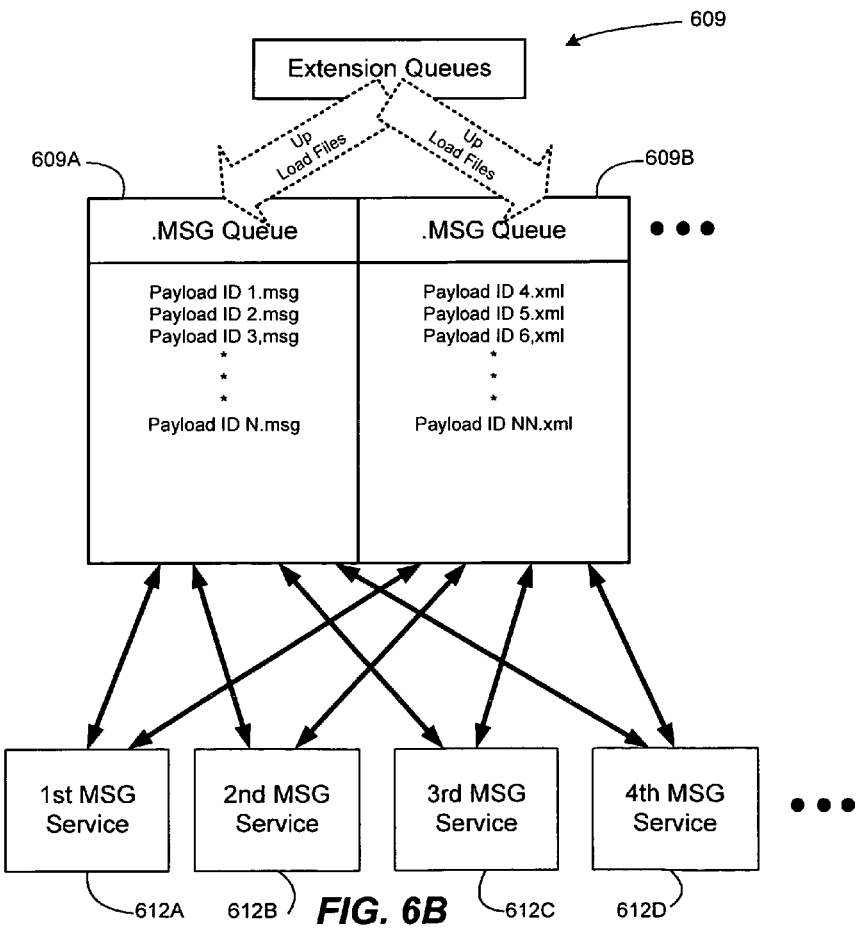
FIG. 6B is a functional block diagram illustrating further details of dual extension queues and double redundant services architecture according to an exemplary embodiment of the invention.
Figure 6A:
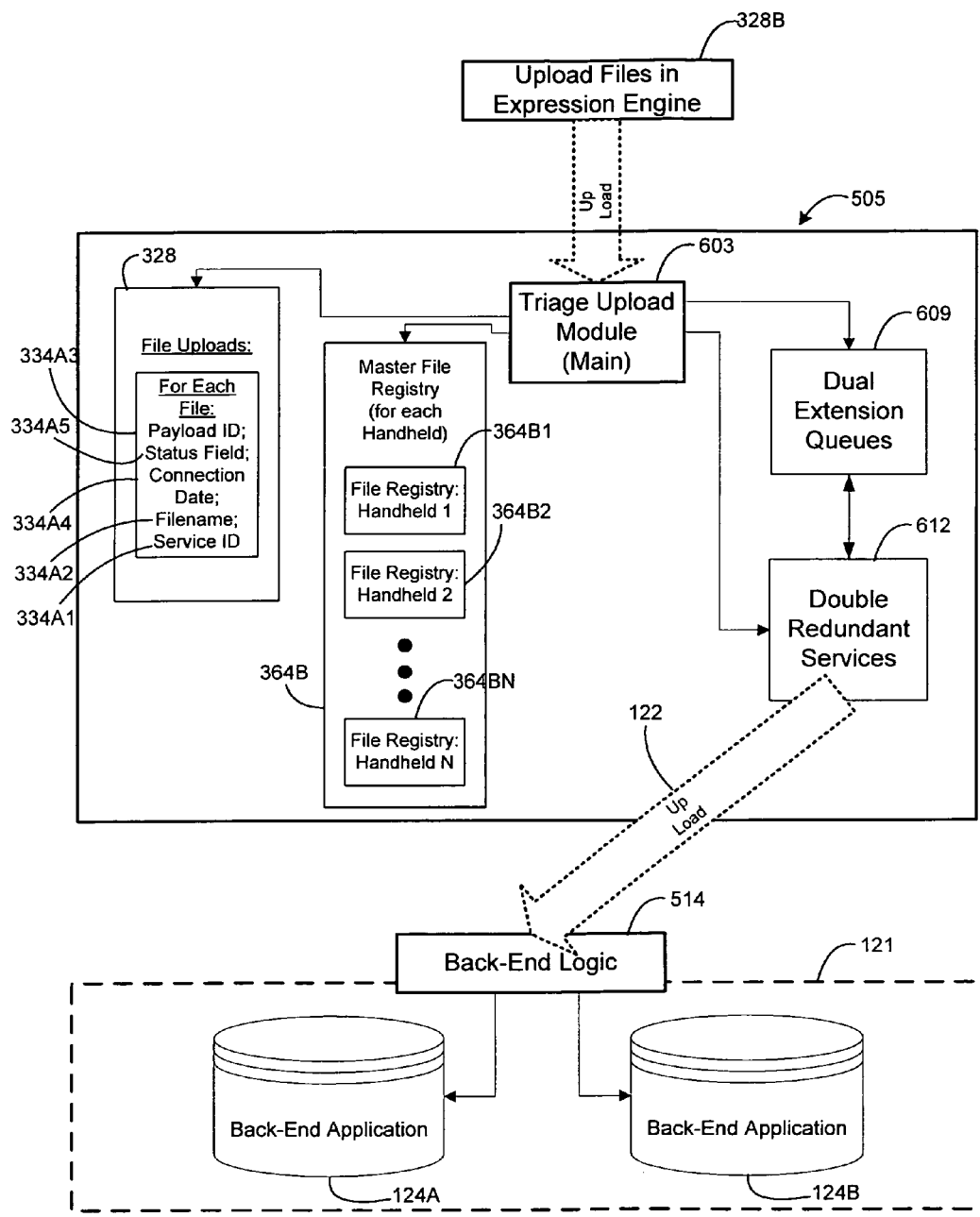
FIG. 6A is a functional block diagram illustrating further details of an exemplary triage upload module and its associated files according to an exemplary embodiment of the invention.

Referring now to FIG. 6A, this figure is a functional block diagram illustrating further details of an exemplary triage upload module 505. The triage upload module 505 can comprise a main upload module 603 that can manage a plurality of dual extension queues 609 that are coupled with a double redundant services architecture 612. Further details of the dual extension queues 609 and the double redundant services architecture 612 will be discussed in further detail below with respect to FIG. 6B.

The triage upload module 505 can further comprise a list 606 of file registries that it maintains for each respective mobile hand-held computer 103. As noted above, each file registry 364 that is stored in the list of registry 606 can be compared by the triage upload module 603 with the file registry 364 that may be uploaded from a respective mobile hand-held computer 103. In this way, the triage upload module can insure that duplicate files will not be uploaded from the mobile hand-held computer 103. The triage upload main module 603 can be coupled to a file upload directory 328. For each file in the upload directory 328, the triage upload module 603 can track the service identifier 334A1, the file name 334A2, the payload identifier 334A3, a connection date 334A4 and a status field 334A5.

The triage upload module 505 can be virtually connected to back-end logic 514 as indicated by the virtual connection 122 indicated with dashed arrows in FIG. 6. The triage upload module can be written in the C++ computer language, however, one of ordinary skill in the art recognizes that other computer languages are not beyond the scope of the invention. The triage upload module 603, through its services 612 described below, can send data to the back-end logic 514 over the computer communications network 109.

The overall function of the triage module 505 is to allow the wireless hand-held computer 103 to end the wireless communication link 106 as soon as practically possible. The triage module 505 allows data from the wireless hand-held computer 103 to be driven down to the expression engine 118 as quickly as possible during a communications link 106. The triage module 505 is based on the concepts of CPU recruitment and parallelism through the use of file extensions in a very scaleable and durable manner.

Referring now to FIG. 6B, this figure is a functional block diagram illustrating further details of the dual extension queues 609 and the double redundant services architecture 612 according to an exemplary embodiment of the invention. FIG. 6B illustrates one emphasis of the inventive middleware system 100 in which the file extensions for data files 334 are one of several key parameters that allow the inventive middleware system 100 to increase processing speed and efficiency during a communication link 106 in which a wireless mobile hand-held computer 103 can exchange data with the articulation engine 115 and ultimately the expression engine 118.

For each file type that has a unique extension, the triage upload module 603 assigns each file extension at least or a minimum of two queues to store data as it is received by the triage upload module 603. Each of these queues 609A, 609B, can be serviced and processed by a redundant services architecture 612. The redundant services architecture 612 basically comprises assigning two software services 612 to a particular set of queues.

For example, a first software service 612A can be designed to service a first queue 609A and the second queue 609B. Similarly, a second software service 612B can be designed to service the first extension queue 609A and the second extension queue 609B. This means that the third software service 612C can also service the first extension queue 609A and the second extension queue 609B.

And lastly, the fourth software service 612D can be coupled to the first extension queue 609A and the second extension queue 609B. In this way, the redundant services architecture 612 can have that at least four software services 612 that will be processing a respective file extension queue 609. With this architecture, the upload triage module 505 is very flexible yet durable to handle a significant amount of data. Further, the main triage upload module 603 can run according to a set of rules in which if the main upload triage module 603 does not understand a particular file type with a particular extension, then it can instantiate or create a new extension queue 609 and start placing files with the newly identified file extensions into their appropriate new queues 609.

The main triage upload module 603 may be characterized as self-configuring because it can determine if a particular file type with a particular extension is unknown. If a file type is unknown, the triage upload module 603 may then establish new queues 609 and respective dual software services 612 for processing the unknown file type.

Figure 7:
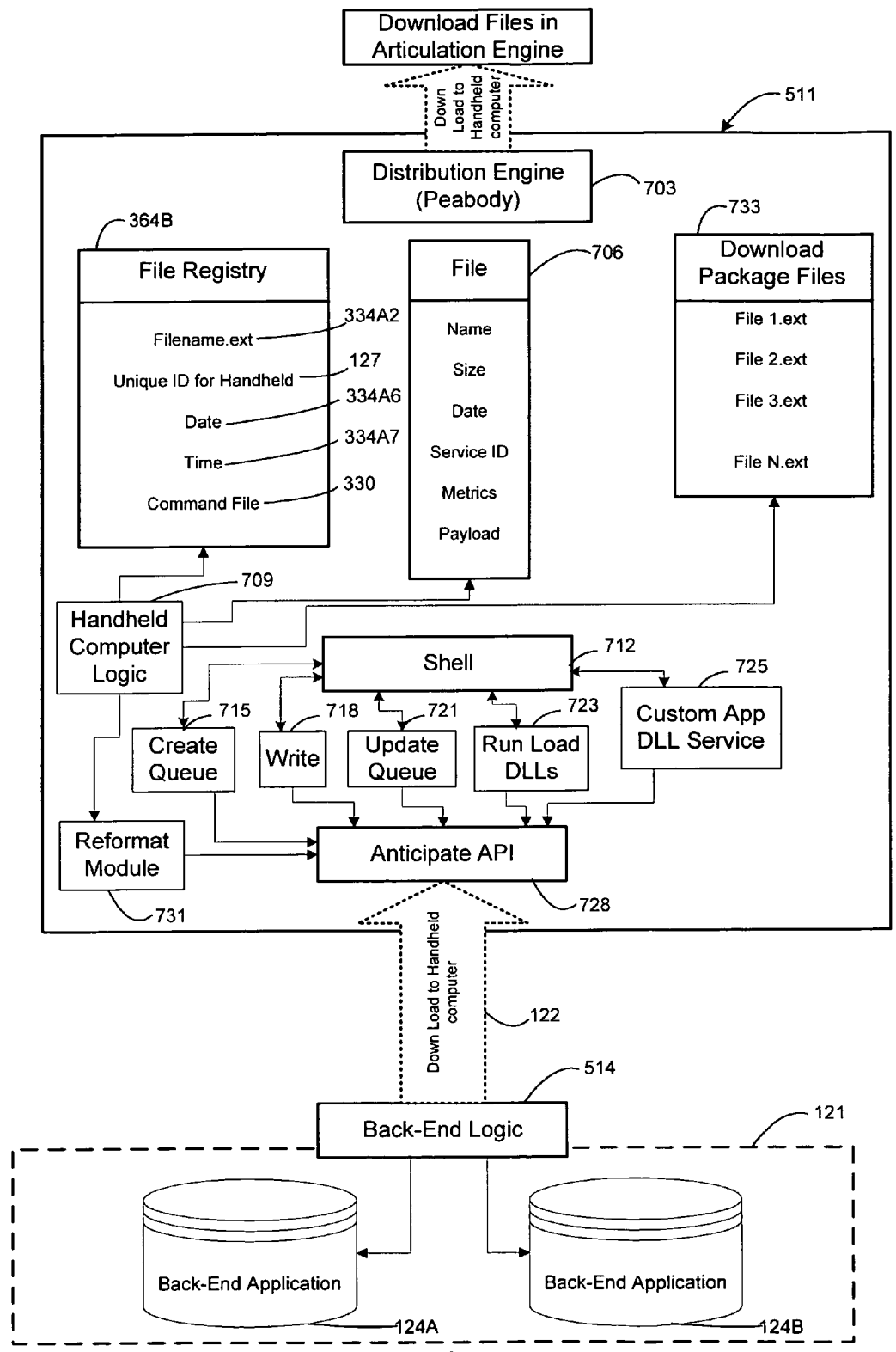
FIG. 7 is a functional block diagram illustrating further details of an exemplary distribution download module according to an exemplary embodiment of the invention.

Referring now to FIG. 7, this figure is a functional block diagram illustrating further details of an exemplary distribution download module 511 according to an exemplary embodiment of the invention. The distribution module 511 can comprise a main distribution module 703, device logic 709, a shell module 712, a create queue 715, a write queue 718, an update queue 721, a run load DLLs module 723, and a customer application DLL service module 725, and an anticipate application programming interface (API) 728.

The distribution engine 511 can maintain a file registry 364B similar to the file registry 364A that may be maintained in a particular mobile hand-held computer 103 as discussed above. The file registry 364B can indicate what files are associated with a particular mobile hand-held computer 103 based on the unique identifier 127 assigned to a particular mobile hand-hand computer 103. The file registry 364B maintained by the distribution engine 511 further provides the date and time 334A6 in which the files were created by the hand-held device logic 709.

The handheld device logic 709 determines how to route information that is being received by a reformatting module 731 that is coupled to an anticipate application program interface (API) 728. The reformatting module 731 provides logic that determines how to package and assemble download information as packages that can be handled by respective mobile hand-held computers 103. The back-end logic 514 is coupled to the anticipate API 728 through the virtual connection 122 indicated by dashed arrows. The back-end logic 514 is instructed on how to take information from the back-end computer system 121 and feed it on a schedule to the anticipatory API 728. The anticipate API 728 allows the reformat module 731 to receive the information from the back-end logic 514.

The hand-held device logic 709 routes the packages it receives from the reformat module 731 to a download package file directory 733. The hand-held device logic 709 is used to anticipate what a particular hand-held computer 103 may need during a next communication link 106. The hand-held device logic 709 can identify which device may need a particular data package that is now maintained in the download directory 733 and the hand-held device logic 709 can also identify which mobile computer has already received that package by reviewing the file registry 364. The hand-held device logic 709 can evaluate the dates and times of the files in order to determine when a particular mobile hand-held computer received a file. In this way, the hand-held device logic 709 can anticipate the needs of the mobile hand-held computer 103.

The back-end logic 514 monitors the back end computer system 121 for events or, alternatively (or concurrently), at scheduled times (once a minute, once a day, once a month), it will retrieve data that is destined for one or more wireless hand-held computers 103. The back-end logic works through the anticipate API 728 to access the shell 712. The shell 712 manages the create queue module 715, write module 718, update queue 721, run load DLLs module 723, and custom app DLL service module 725. The create queue module 715 is used to create a new queue for any new type of download file. The custom app DLL services module 725 is dynamically linked library that is created to service one type of queue that is created by the create queue module. The shell 712 uses the update queue to add new information to an existing queue if any new information becomes available from the back-end logic 514. When shell 712 is activated by the anticipate API 728, the shell 712 uses run load DLL module 723 to activate a custom app DLL service to process a particular queue. The custom app DLL services are designed to process queues in order to "express" or format the data in the queues for downloads to specific wireless hand-held computers 103.

By using the file registry 364, monitoring the queues created by the shell 712, and monitoring the dates and times of all files, the distribution engine 511 anticipates the needs of respective mobile hand-held computers 103 and only those files that have changed since the last time a particular mobile hand-held computer 103 was connected or flagged for delivery will be sent to the corresponding mobile hand-held computer 103. As noted above, increasing the efficiency of a communications link 106 by determining which files need to be sent to a hand-held computer 103 prior to a communications link 106 being established and while one is established, can reduce the amount of time taken for a particular download to a hand-held computer 103.

Figure 8:
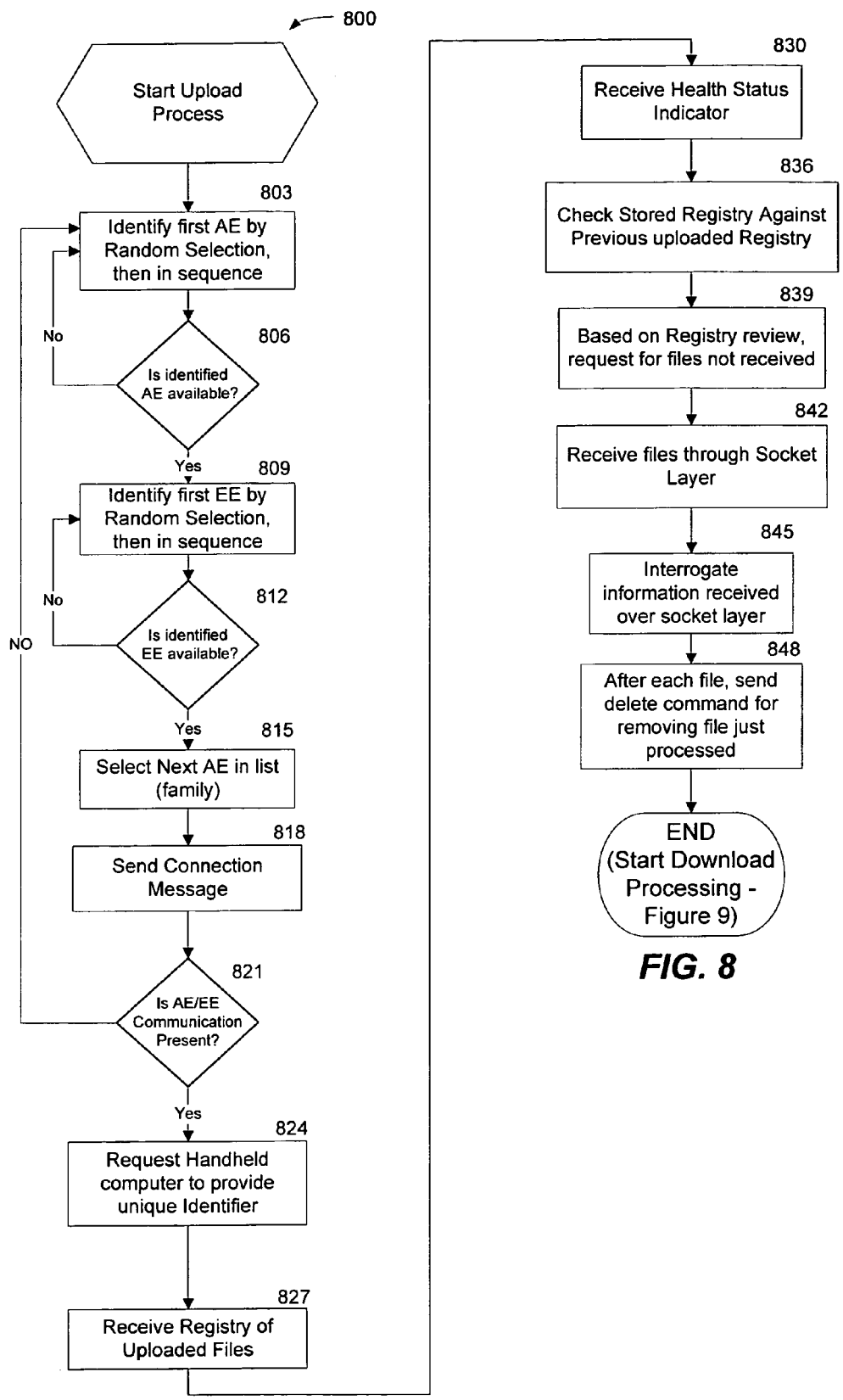
FIG. 8 is a logic flow diagram illustrating an exemplary method for communicating fur uploading data from a mobile hand-held computer to a back-end computer system according to one exemplary embodiment of the invention.

Referring now to FIG. 8, this figure is logic flow diagram illustrating an exemplary method 800 for uploading data from a mobile hand-held computer 103 to a back-end computer system 121 according to one exemplary embodiment of the invention. As noted above, the upload process 800 can be initiated by a hand-held computer 103 at set scheduled times during the day or by using predetermined intervals of a certain length. Further, the upload process 800 can also be initiated by the back-end computer system 121 if the back-end computer system determines that a particular hand-held computer needs a particular file or if the hand-held computer 103 has a file that is needed by the back-end computer system 121. In this way, by scheduling a communications link 106, the middleware system 100 can take advantage of a down-time or off-line time away from the hand-held computer 103 so that the system 100 in an "asynchronous" manner can anticipate information that may need to be exchanged during a communications link.

The processes and operations of the middleware system 100 described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

Referring again to FIG. 8, step 803 is the first step in the exemplary upload process 800. In step 803, available articulation engines 115 are identified by random selection. For example, a mobile hand-held computer 103 can identify its corresponding articulation engine 115 by randomly selecting a computer network address 133 from a listing 130A of computer network addresses 130 that are stored in the mobile hand-held computer 103. This random selection can be used for the first selection, meanwhile, subsequent selections can be made in sequence or in an order that follows the initial or first random selection. However, randomizing for every selection from the list 130 of computer network addresses is not beyond the scope of the invention.

Next in decision step 806, it is determined whether the selected articulation engine 115 is available. If the inquiry to decision step 806 is negative, then the "no" branch is followed to step 809 in which the next articulation engine 115 can be selected from the list 130 of available articulation engines 115 that correspond to a particular mobile hand-held computer 103. If the inquiry to decision step 806 is positive, then the "yes" branch is followed down to decision step 812.

In decision step 812, an inquiry is made to determine if an expression engine 118 is available for the selected articulation engine 115. If the inquiry to decision step 812 is negative, then the "no" branch is followed to step 815 in which a next expression engine 118 is selected in the list 130B1 that is stored in a respective articulation engine 115. If the inquiry to decision step 812 is positive, then the "yes" branch can be followed to step 818 in which a connection message is sent to the mobile hand-held computer 103.

In step 818, the socket layer between the mobile hand-held computer 103 and the articulation engine 115 may be initiated or become opened. Subsequently, decision step 821 reflects a periodic loop in which a selected articulation engine 115 verifies that its connection with the expression engine 118 is present. Decision step 821 can be characterized as a "heartbeat" inquiry which means that this decision step is repeated over a very frequent time schedule in parallel with the execution of the subsequent or previous steps.

If the inquiry to decision step 821 is no, then the "no" branch is followed back to decision step 812. If the inquiry to decision step 821 is yes, then the "yes" branch is followed to step 824 in which a request is made for the unique identifier 127A that is associated with a mobile hand-held computer 103. In step 827, the articulation engine 115 can receive the registry of upload files that were formed by the mobile hand-held computer 103 just prior to a wireless link 106 being established between the mobile hand-held computer 103 and the articulation engine 115. Next in step 830, the articulation engine 115 can receive a statement of health status indicator 340 from a respective mobile hand-held computer 103. Next, in step 833, the articulation engine 115 can issue a command to the mobile hand-held computer 103 to delete its current statement of health indicator 340.

Next, in step 836, the expression engine can check its file registry 364B against the file registry 364A that is received from the mobile hand-held computer 103. In step 839, after the expression engine 118 has determined what files it needs from the mobile hand-held computer 103, in step 839, the expression engine 118 requests the articulation engine 115 to issue a request of the files that have not been received by the back-end computer system 121.

Subsequently, in step 842, the articulation engine 115 can receive files from the mobile hand-held computer 103 through a socket layer 406. Theses files are then processed with the double redundant queue service as described above with respect to FIG. 6B. Next, in step 845, the files that are received by the articulation engine 115 can be separately interrogated over the socket layer. In other words, in step 845, and referring briefly to FIG. 4, the file data packet optimizer 403 can identify the appropriate packet sizes in order to optimize the communications made over a communication link 106.

In step 848, after each received file, the articulation engine 115 can issue a command to the mobile hand-held computer 103 to delete the file that was just uploaded to the articulation engine 115. In step 851, the upload process ends and the download process of FIG. 9 can be initiated.

Figure 9:
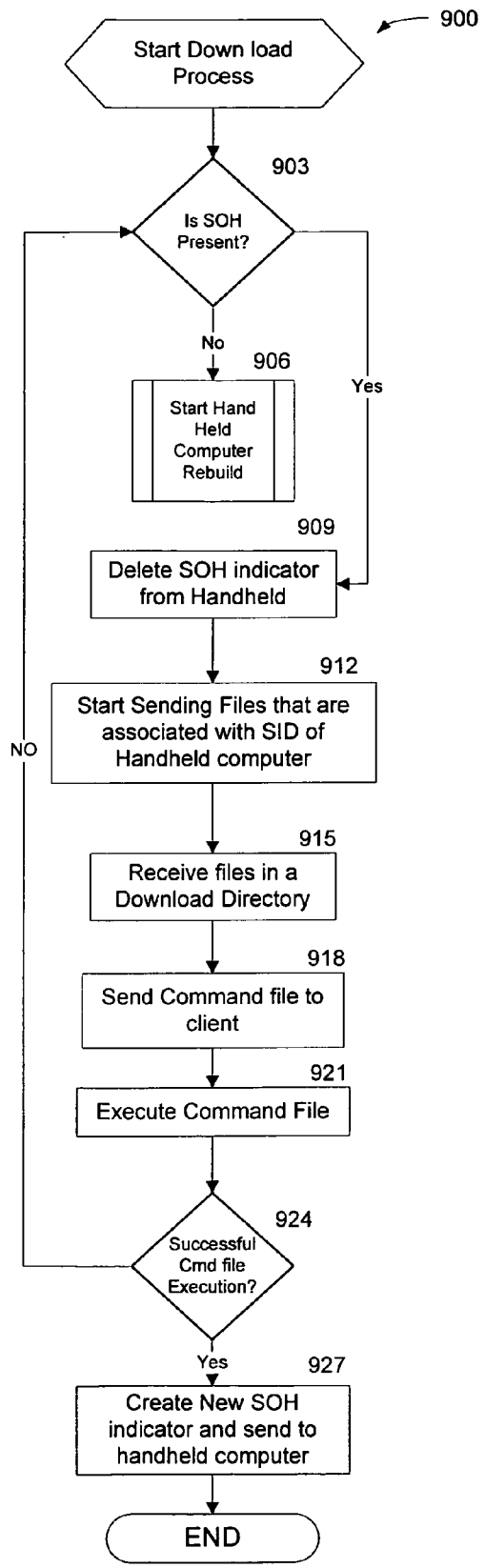
FIG. 9 is a logic flow diagram illustrating an exemplary method for communicating or downloading data from a back-end computer system to a wireless hand-held computer according to one exemplary embodiment of the invention.

Referring now to FIG. 9, this figure is a logic flow diagram illustrating an exemplary method 900 for communicating or downloading data from a back-end computer system 121 to a wireless hand-held computer 103 according to one exemplary embodiment of the invention. The first step in the method 900 for downloading is decision step 903. In decision step 903, the expression engine 918 determines if the statement of help indicator is present on the mobile hand-held computer 103. If the inquiry to decision step 903 is negative, then the "no" branch is followed to routine 906. During the client rebuild process, the expression engine 118 will start sending larger software application files, such as client executable application files, to the mobile hand-held computer 103 in order to make the mobile hand-held computer 103 operational or be placed in a state of operability.

If the inquiry to decision step 903 is positive, then the "yes" branch is followed to step 909 in which the statement of help indicator 340 is deleted from the mobile hand-held computer 103. Subsequently, in step 912, the expression engine 118 forwards files associated with the unique identifier 127 of the mobile hand-held computer 103. The articulation engine 115 relays these files to the mobile hand-held computer 103. Next, in step 915, the mobile hand-held computer 103 can receive the download files in a download directory 325.

Next, in step 918, the articulation engine 115 sends a command file to the mobile hand-held computer 103. As noted previously, the command file can comprise one or more commands and relative paths toward the files that are downloaded to the wireless hand-held computer 103 from the articulation engine 115.

Later, in step 921, the mobile hand-held computer 103 can execute the command file. The execution of the command file can place the downloaded data files 334 in their correction locations within the mobile hand-held computer 103. Next, in decision step 924, it is determined whether a successful execution of the command file has occurred. If the inquiry to decision step 924 is positive, then the "yes" branch is followed to step 927 in which a statement of health indicator 340 is created and sent to the mobile hand-held computer 103.

If the inquiry to decision step 924 is negative, then the "no" branch is followed in which the download process ends without a statement of health indicator 340 being created and sent to the mobile hand-held computer 103. In this way, during the next communication link 106, the expression engine 118 will discover that the mobile hand-held computer 103 does not have a statement of health indicator 340 and for the subsequent download it will initiate a reboot of the middleware system on the mobile hand-held computer 103.

It should be understood that the foregoing relates only to illustrate the embodiments of the invention, and that numerous changes may be made therein without departing from the scope and spirit of the invention as defined by the following claims.

What is claimed is:

1. A computer-implemented method for communicating data between a wireless mobile hand-held computer and a back-end computer system comprising the following steps performed in sequence:

assigning a static and unique authentication identifier for the wireless mobile hand-held computer prior to the wireless mobile hand-held initiating any communications;

assigning the wireless mobile hand-held computer to a group of articulation engines based on the static and unique authentication identifier for the wireless mobile hand-held computer;

storing a first list of the articulation engines from the group in memory of the wireless mobile hand-held computer, the articulation engines for receiving communications from the wireless mobile hand-held computer;

initiating a request to establish a communications link between the wireless mobile hand-held computer and the back-end computer system;

identifying an articulation engine from the first list of articulation engines for receiving communications from the wireless mobile hand-held computer which are stored in memory of the wireless mobile hand-held computer, the articulation engine comprising a first computer server, wherein the step of identifying an articulation engine from the first list further comprises randomly selecting a first articulation engine from the first list;

determining if the identified first articulation engine is available;

if the first articulation engine is not available, then selecting the next articulation engine in sequence on the first list after failure of the random selection of the first articulation engine;

identifying an expression engine for receiving communications from the articulation engine by randomly selecting an expression engine from a second list, the second list containing articulation engines, each expression engine comprising a second computer server, each expression engine further comprises dual extension queues for processing uploaded files received from the mobile hand-held computer;

after identifying an articulation engine and expression engine, sending a connection message to the wireless mobile hand-held computer;

monitoring a communication link between the articulation engine and expression engine;

requesting with the articulation engine the static and unique authentication identifier that uniquely identifies the wireless mobile hand-held computer;

granting access to the identified articulation engine without any rigorous authentication if the static and unique authentication identifier of the wireless mobile hand-held computer matches a corresponding static and unique authentication identifier in a list of static and unique authentication identifiers maintained by the identified articulation engine;

receiving a file registry comprising a third list, the third list containing names of files contained within the wireless mobile hand-held computer;

receiving a statement of health indicator from the wireless mobile hand-held computer;

receiving the files with the articulation engine;

creating and sending a command file with the articulation engine to the wireless mobile hand-held computer, the command file comprising commands for the wireless mobile hand-held computer; and creating and sending a statement of health indicator with the articulation engine to signify successful completion of downloaded files to the wireless mobile hand-held computer.

2. The method of claim 1, further comprising the step of stopping communications with the wireless mobile hand-held computer if a communication link between the articulation engine and expression engine fails.

3. A computer-implemented system for communicating data between a wireless mobile hand-held computer and a back-end computer system comprising:

a wireless mobile hand-held computer running a client process engine for managing communications with an articulation engine, the articulation engine comprising a first computer server, the wireless mobile hand-held computer storing in memory an authentication identifier that is static and unique to the wireless mobile hand-held computer prior to the wireless mobile hand-held computer starting any communications, the wireless mobile hand-held computer being assigned to a group of articulation engines based on the static and unique authentication identifier, the wireless mobile hand-held computer further storing in memory a first list of the group of assigned articulation engines for communication, the wireless mobile hand-held computer performs the following steps in sequence: the wireless mobile hand-held computer randomly selects a first articulation engine from the first list of assigned articulation engines for establishing communication with the selected first articulation engine, the wireless mobile hand-held computer selects subsequent articulation engines after the first selected articulation engine in sequence from the first list after failure of the random selection of the first articulation engine in order to promote a communication load balancing among the articulation engines on the first list; the wireless mobile hand-held computer creating a statement of health indicator to signify successful completion of downloaded files to the wireless mobile hand-held computer after a connection and file transfer with an articulation engine has been made;

an articulation engine for receiving data from and sending data to the wireless mobile hand-held computer, the articulation engine storing in memory a second list of static and unique authentication identifiers in memory corresponding to one or more wireless mobile hand-held computers that are served by the articulation engine, the articulation engine granting access to the wireless mobile hand-held computer without any rigorous authentication if the static and unique authentication identifier of the mobile hand-held computer matches one in the second list of static and unique authentication identifiers, the articulation engine further storing in memory a third list of available expression engines, wherein the articulation engine randomly selects an expression engine from the third list of available expression engines; the articulation engine performing the following steps in sequence: receiving a file registry comprising a list of files contained within the wireless mobile hand-held computer; the articulation engine receiving files from the wireless mobile hand-held computer; the articulation engine receiving a statement of health indicator from the wireless mobile hand-held computer after a connection and file transfer with the articulation engine has been made by the wireless mobile hand-held computer; and an expression engine for receiving data from and sending data to the articulation engine, the expression engine comprising a second computer server, the expression engine coupled to the back-end computer system, for processing information received from back-end computer system, the expression engine comprises dual extension queues for processing uploaded files received from the mobile hand-held computer.

4. The system of claim 2, wherein the expression engine comprises double services for managing the files received from the wireless mobile hand-held computer that are established for each file type.

* * * * *